US006988637B2

(12) United States Patent
Floyd et al.

(10) Patent No.: US 6,988,637 B2
(45) Date of Patent: *Jan. 24, 2006

(54) APPARATUS AND METHODS FOR A CUSTOMER TO PRODUCE AND DISPENSE AUTOMOBILE APPEARANCE CARE PRODUCTS

(75) Inventors: Timothy H. Floyd, Garland, TX (US); Paul David Miller, III, Dallas, TX (US)

(73) Assignee: Auto Wax Company, Inc., Dallas, TX (US)

( * ) Notice: Subject to any disclaimer, the term of this patent is extended or adjusted under 35 U.S.C. 154(b) by 101 days.

This patent is subject to a terminal disclaimer.

(21) Appl. No.: 10/646,372

(22) Filed: Aug. 22, 2003

(65) Prior Publication Data

US 2004/0065674 A1 Apr. 8, 2004

Related U.S. Application Data

(63) Continuation-in-part of application No. 10/321,779, filed on Dec. 17, 2002.

(60) Provisional application No. 60/342,575, filed on Dec. 19, 2001.

(51) Int. Cl.
*G01F 11/00* (2006.01)

(52) U.S. Cl. .............................. 222/1; 222/2; 222/135; 222/145.5; 222/529; 222/626

(58) Field of Classification Search .................... 222/1, 222/2, 64, 129, 135, 145.1, 145.5, 145.6, 222/145.7, 145.8, 156, 383.1, 527, 529, 608, 222/626

See application file for complete search history.

(56) References Cited

U.S. PATENT DOCUMENTS

| | | | | |
|---|---|---|---|---|
| 3,826,113 A | * | 7/1974 | Boraas et al. | 68/12.18 |
| 3,883,042 A | * | 5/1975 | Junker | 222/23 |
| 3,974,847 A | | 8/1976 | Hodges | |
| 3,976,227 A | * | 8/1976 | Ray | 222/136 |
| 4,144,915 A | | 3/1979 | Henderson | |
| 4,276,997 A | * | 7/1981 | Ambler | 222/23 |
| 4,475,666 A | | 10/1984 | Bilbrey | |
| 4,632,275 A | * | 12/1986 | Parks | 222/25 |
| 4,964,185 A | | 10/1990 | Lehn | |
| 4,976,137 A | | 12/1990 | Decker | |
| 5,016,790 A | | 5/1991 | Thomas | |
| 5,020,917 A | * | 6/1991 | Homan | 366/160.4 |
| 5,033,649 A | | 7/1991 | Copeland | |

(Continued)

OTHER PUBLICATIONS

C. Peterson, "The Shifting trends in carwash chemical metering", Professional Carwashing & Detailing Magazine, pp. 60-64, May 2003.

(Continued)

*Primary Examiner*—Joseph A. Kaufman
(74) *Attorney, Agent, or Firm*—Meyertons, Hood, Kivlin, Kowert & Goetzel, P.C.; Eric B. Meyertons

(57) ABSTRACT

An apparatus may be used to dispense a plurality of automotive appearance care products. The apparatus may include a plurality of storage containers. Mixing systems may be coupled to the storage containers. The mixing systems may combine raw materials with a carrier fluid to produce product fluids. The product fluids may be stored in storage vessels. A plurality of pumps may be used to produce a flow of one or more product fluids. The product fluids may be dispensed through one or more dispensing conduits. A user may dispense the product fluids for use as automotive appearance care products. The user may receive a statement of a fee for using the apparatus based on a selected basis.

58 Claims, 13 Drawing Sheets

U.S. PATENT DOCUMENTS

| | | | | |
|---|---|---|---|---|
| 5,083,872 | A | 1/1992 | Farling | |
| 5,137,694 | A | 8/1992 | Copeland | |
| 5,174,472 | A | 12/1992 | Raque | |
| 5,203,366 | A | 4/1993 | Czeck | |
| 5,228,594 | A | 7/1993 | Aslin | |
| 5,259,557 | A | 11/1993 | Spriggs | |
| 5,344,074 | A | 9/1994 | Spriggs | |
| 5,427,694 | A | 6/1995 | Rugg | |
| 5,445,195 | A | 8/1995 | Kim | |
| 5,497,914 | A * | 3/1996 | Maltsis | 222/135 |
| 5,505,915 | A | 4/1996 | Copeland | |
| 5,542,605 | A | 8/1996 | Campau | |
| 5,560,523 | A | 10/1996 | Chaki | |
| 5,584,327 | A | 12/1996 | Thomas | |
| 5,607,651 | A | 3/1997 | Thomas | |
| 5,651,398 | A | 7/1997 | Decker | |
| 5,655,563 | A | 8/1997 | Johnson | |
| 5,667,113 | A * | 9/1997 | Clarke et al. | 222/608 |
| 5,746,238 | A | 5/1998 | Brady | |
| 5,782,109 | A | 7/1998 | Spriggs | |
| 5,799,831 | A | 9/1998 | Spriggs | |
| 5,871,590 | A | 2/1999 | Hei | |
| 5,873,268 | A | 2/1999 | Spriggs | |
| 5,873,500 | A * | 2/1999 | Homburg et al. | 222/608 |
| 5,915,592 | A | 6/1999 | Mehus | |
| 5,961,011 | A | 10/1999 | Thomas | |
| 5,967,202 | A | 10/1999 | Mullen | |
| 5,975,352 | A | 11/1999 | Spriggs | |
| 6,006,388 | A | 12/1999 | Young | |
| 6,055,831 | A * | 5/2000 | Barbe | 68/12.18 |
| 6,061,608 | A | 5/2000 | Moldavsky | |
| 6,079,595 | A | 6/2000 | Meyer | |
| 6,098,646 | A | 8/2000 | Hennemann | |
| 6,105,633 | A | 8/2000 | Pedersen | |
| 6,105,638 | A | 8/2000 | Edwards | |
| 6,143,257 | A | 11/2000 | Spriggs | |
| 6,158,486 | A | 12/2000 | Olson | |
| 6,158,673 | A | 12/2000 | Toetschinger | |
| 6,237,807 | B1 | 5/2001 | Uhl | |
| 6,260,772 | B1 | 7/2001 | Hennemann | |
| 6,279,836 | B1 | 8/2001 | Toetschinger | |
| 6,293,294 | B1 * | 9/2001 | Loeb et al. | 137/1 |
| 6,463,611 | B1 | 10/2002 | Mattia | |
| 6,655,548 | B2 * | 12/2003 | McClure et al. | 222/57 |
| 2002/0128169 | A1 | 9/2002 | Levitt | |
| 2003/0201282 | A1 | 10/2003 | Floyd et al. | |
| 2004/0060946 | A1 | 4/2004 | Floyd et al. | |
| 2004/0065675 | A1 | 4/2004 | Floyd et al. | |
| 2004/0065681 | A1 | 4/2004 | Floyd et al. | |
| 2004/0065682 | A1 | 4/2004 | Floyd et al. | |
| 2004/0084478 | A1 | 5/2004 | Floyd et al. | |
| 2004/0206778 | A1 | 10/2004 | Floyd et al. | |

OTHER PUBLICATIONS 1 page advertisement by Detail Plus Car Appearance Care Systems advertised in Modern Car Care, Jan. 2003.

1 page advertisement by Sonny's, The Car Wash Factory and 1 page product description from www.sonnysdirect.com web page, copyright 2002.

* cited by examiner

APPARATUS AND METHODS FOR A CUSTOMER TO PRODUCE AND DISPENSE AUTOMOBILE APPEARANCE CARE PRODUCTS

PRIORITY CLAIM

This application is a continuation-in-part of U.S. patent application Ser. No. 10/321,779 entitled "System and Methods for Producing and Dispensing Automobile Appearance Care Products" filed on Dec. 17, 2002, which claims priority to Provisional Patent Application No. 60/342,575 entitled "System and Methods for Producing and Dispensing Automobile Appearance Care Products" filed on Dec. 19, 2001.

BACKGROUND OF THE INVENTION

1. Field of the Invention

The present invention relates to systems and methods for dispensing automotive appearance care products. Embodiments relate to a transportable, compact system for dispensing multiple automotive appearance care products.

2. Description of the Related Art

Current methods for providing customers with automotive appearance care products involve either supplying the customer with pre-made solutions in large, heavy containers or providing the customer with containers of concentrated fluids and having the customer combine the concentrated fluids with a carrier fluid (e.g., water) to obtain the desired product.

Supplying the customer with pre-made solutions requires delivery and handling of large, heavy containers, which can be costly for the customer. The heavy containers also may be difficult to move from location to location, if so desired. If the customer is a distributor, the customer must also provide a means for transferring the product from the large container to a container suitable for consumers. This process can be time consuming and material may be wasted in the transfer process. It may also be difficult for the distributor to track the amount of product given to consumers if consumers desire varying amounts of product. Storage of the large containers may also take up valuable warehouse or storage space.

Providing the customer with concentrated fluids may reduce the size of containers delivered to the customer, thus saving space and reducing delivery costs. Combining the concentrated fluids with a carrier fluid however, may result in a significant waste of time and money. In addition, improper mixing of the fluids by the customer may result in unreliable product uniformity. Again, it may be difficult for a distributor to easily track the amount of product given to a consumer if consumers desire varying amounts of product. For the customer to be provided with a variety of products, multiple concentrated fluids must be mixed with carrier fluids, which can be a difficult process and can significantly increase the difficulty in tracking product costs to be charged to a consumer.

Thus, there is a need to dispense multiple automotive appearance care products from a system that can be used to accurately track and dispense a large amount of product, saves space, and transports easily. It may also be advantageous to automatically control product dispensing.

SUMMARY

In an embodiment, a system for dispensing a plurality of product fluids may include a plurality of containers. Each container may contain a base fluid. A carrier fluid supply may be coupled to a first conduit to provide a source of carrier fluid. The carrier fluid may be pressurized in the system to provide a substantially constant pressure of carrier fluid. Pressurizing the carrier fluid in the system may provide a more transportable apparatus that can be moved from one location to another location without a need to modify the system. A valve coupled to the first conduit and a supply conduit may control a flow of the carrier fluid from the first conduit to the supply conduit. The base fluid may be mixed with the flow of carrier fluid in the supply conduit.

An injector may control mixing of the base fluid with the carrier fluid to form a product fluid in the supply conduit. In some embodiments, more than one injector for mixing the carrier fluid with more than one base fluid may be disposed along the supply conduit.

A metering device may be coupled to the supply conduit to determine an amount of product fluid dispensed during use. Monitoring the amount of product fluid dispensed by using a metering device may improve the ability to track and determine costs for charging users of the apparatus. A plurality of supply conduits may be disposed in the system and coupled to the first conduit. In certain embodiments, each supply conduit may produce a different product fluid. A separate metering device may be used for each product fluid dispensed.

Each product fluid may be dispensed through an exit valve. In some embodiments, more than one exit valve may be used. Multiple automotive appearance care product fluids may be dispensed in a diluted composition for immediate use. The system may be used to dispense multiple product fluids from a single apparatus regardless of the chemical compatibility of the fluids. The multiple automotive appearance care product fluids may also be dispensed in a concentrated composition requiring dilution before use.

In certain embodiments, a system for dispensing a plurality of automotive appearance care products includes a plurality of storage containers. A raw material may be placed in each storage container. One or more mixing containers may be coupled to each storage container.

Raw materials from the storage containers may be combined with a carrier fluid. The combined raw materials and carrier fluid may be provided to a plurality of mixing containers. In addition, a powder may be added, either manually or automatically, to each mixing container. The raw materials, powders, and/or carrier fluid may be combined in the mixing containers to produce a plurality of mixtures.

Mixtures from the mixing containers may be provided to a plurality of mixing systems. The mixing systems may be located in a dispensing apparatus. The mixing systems may combine the mixtures with carrier fluid to produce a plurality of product fluids. The product fluids may be dispensed to a plurality of storage vessels. A plurality of pumps may be coupled to the storage vessels to pump the product fluids from the storage vessels to a plurality of dispensing conduits. The dispensing conduits may be used to dispense automotive appearance care products that are ready for immediate use by a user.

Systems for dispensing a plurality of automotive appearance care products as described herein may be used in high volume areas (i.e., areas with a high throughput of automobiles processed using the automotive appearance care products). For example, a system may be used to treat between about 150 and about 250 automobiles per day. Using more than one system may substantially increase a possible throughput of automobiles.

In an embodiment, a dispensing apparatus may include storage containers, mixing systems, storage vessels, pumps, and/or dispensing conduits. The storage containers, mixing systems, storage vessels, pumps, and/or dispensing conduits may be located in a housing. The storage containers may contain one or more raw materials. The raw materials may be mixed with a carrier fluid by mixing systems to produce one or more automotive appearance care product fluids. The product fluids may be stored in storage vessels before being dispensed. Pumps may produce a flow of product fluids to one or more dispensing conduits. The dispensing conduits may be used to dispense the product fluids for use as automotive appearance care products.

In an embodiment, a cost to be charged to a user may be based on a number of automobiles the user treats using the automotive appearance care products produced by a system for dispensing product fluids. In certain embodiments, a cost to be charged to a user may be based on a per application basis. Charges based on a number of treated automobiles or on a per application basis, rather than on an amount of fluid dispensed or fluid used, may reduce the number of costs associated with using the automotive appearance care products that a user of the system may have to consider for budgeting.

In some embodiments, product fluids (or automotive appearance care products) may be dispensed substantially automatically by the system. Automatically dispensing products may reduce excess use of raw materials or base fluids by a user of the system. Automation may include limiting operating of the system by use of an on/off switch and/or dispensing the product fluids by operating a fluid applicator. Such automation may increase a lifetime of the system or apparatus and/or control the use of fluids and materials in the system.

BRIEF DESCRIPTION OF THE DRAWINGS

Advantages of the present invention may become apparent to those skilled in the art with the benefit of the following detailed description of the preferred embodiments and upon reference to the accompanying drawings in which.

Figure 1:
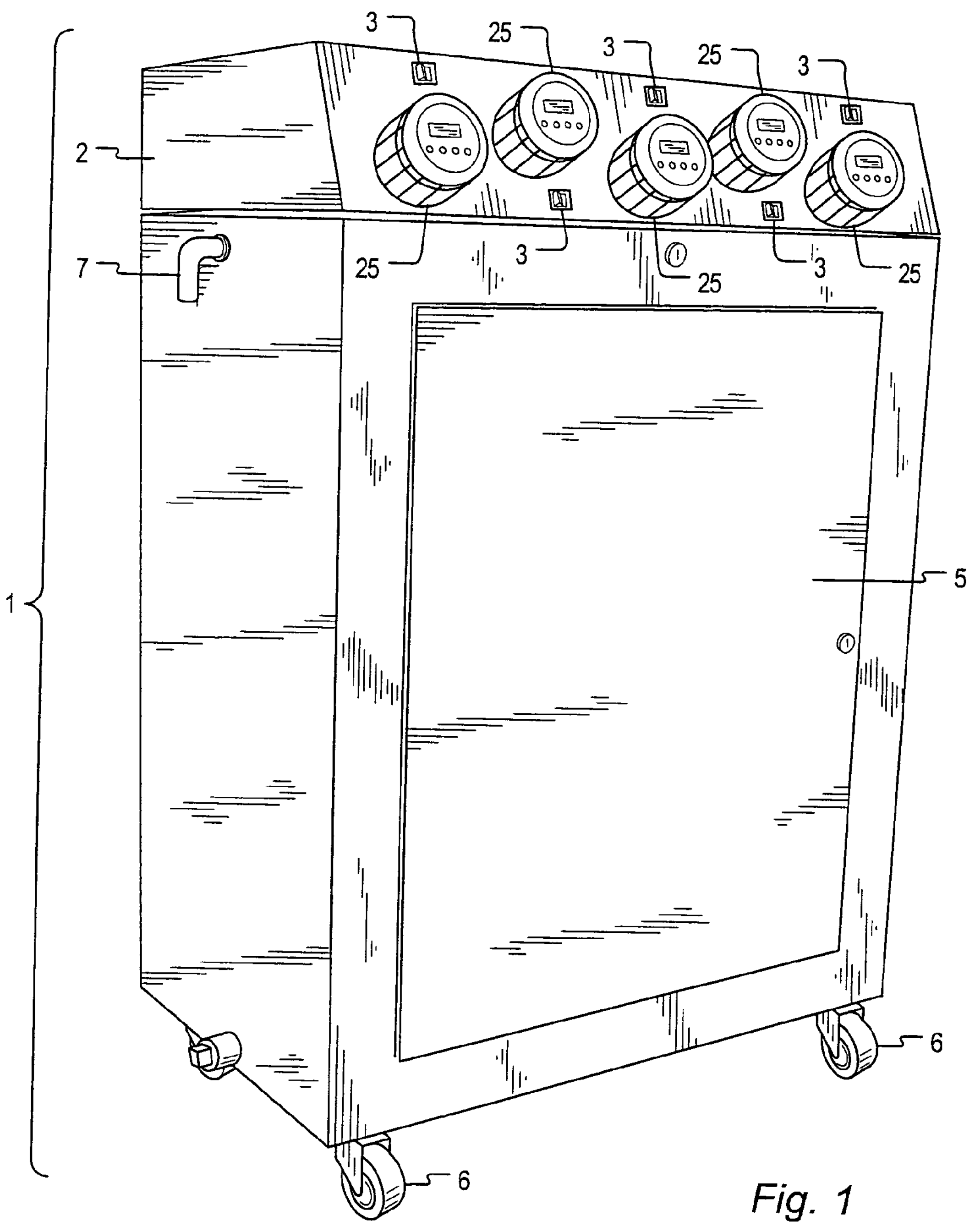
FIG. 1 depicts an embodiment of a system for dispensing a plurality of automotive appearance care products.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

For the purposes of this patent, "manufacturer" is defined as a maker or builder of apparatus or systems described herein. A manufacturer may sell or lease an apparatus. In certain embodiments, the manufacturer may repair, replace, or maintain an apparatus or components of the apparatus.

A "distributor" is defined as a buyer or leaser of an apparatus. A distributor may further lease the apparatus to a user or customer. A distributor may use an apparatus to produce product fluids that are later sold to or consumed by users or customers. In some cases, a distributor may package the product fluids for sale or consumption. In certain embodiments, a distributor may repair, replace, or maintain an apparatus or components of the apparatus. For example, a distributor may lease an apparatus to a user and maintain a supply of raw materials for the apparatus during use by the user and/or repair any problems with the apparatus.

A "user" is defined as an end user of an apparatus or system as described herein. The user may be a customer of a distributor or manufacturer of the apparatus that uses product fluids described herein directly for automotive appearance care. In some embodiments, a user may be an automobile detailer, an automobile car wash, or an automobile auction.

Product fluids dispensed in any of the embodiments described herein are used as automotive appearance care products. Examples of such product fluids include, but are not limited to, degreasers, all-purpose automotive cleaners, car wash soaps, wheel cleaners (e.g., non-acid wheel cleaners), glass cleaners, dressing fluids (e.g., water-based dressings or solvent-based dressings), glass lubricants, polishes, abrasive polishes, waxes, paint sealants, clear coat, clear coat protectors, or other substantially similar products that may be used in automotive appearance care. Further examples of product fluids include quick detail sprays, clay lubricants, and fabric or carpet cleaners or protectorants. Some product fluids may include Auto Magic® products such as Motor Degreaser, Red Hot®, Glass Cleaner Concentrate, Enzyme Pre-spot, XP Citrus Wheel Cleaner™, Special Cleaner Conc.™, and Super Dress-It®. Some product fluids may include non-dilutable products (i.e., fluids dispensed in concentrated form). In some embodiments, a dispensing apparatus may be used to dispense product fluids that are concentrated fluids needing further dilution before use. In certain embodiments, a dispensing apparatus may dilute the product fluids and dispense product fluids that are ready for immediate use by a user or consumer.

An embodiment of a compact, transportable automotive appearance care product dispensing apparatus is shown in FIG. 1. Apparatus 1 may have switches 3 and metering devices 25 located on top cabinet 2. In main cabinet 5 may be located a plurality of containers comprising base fluids for use as a component of an automotive appearance care product fluid. At least one exit valve 7 may be mounted on a side of apparatus 1 for dispensing multiple product fluids. A dispensing conduit may be coupled to exit valve 7. The dispensing conduit may be made of any material chemically inert to a dispensed fluid. Materials that may be used include rubbers, polymeric materials, and/or metals. The dispensing conduit may be permanently coupled to exit valve 7. The dispensing conduit may be removably coupled to exit valve 7. Removably coupling the dispensing conduit to exit valve 7 allows dispensing conduits to be changed or replaced when other types of fluids are dispensed. In an embodiment, wheels 6 are mounted on apparatus 1 to provide for mobility of the apparatus.

Figure 2:
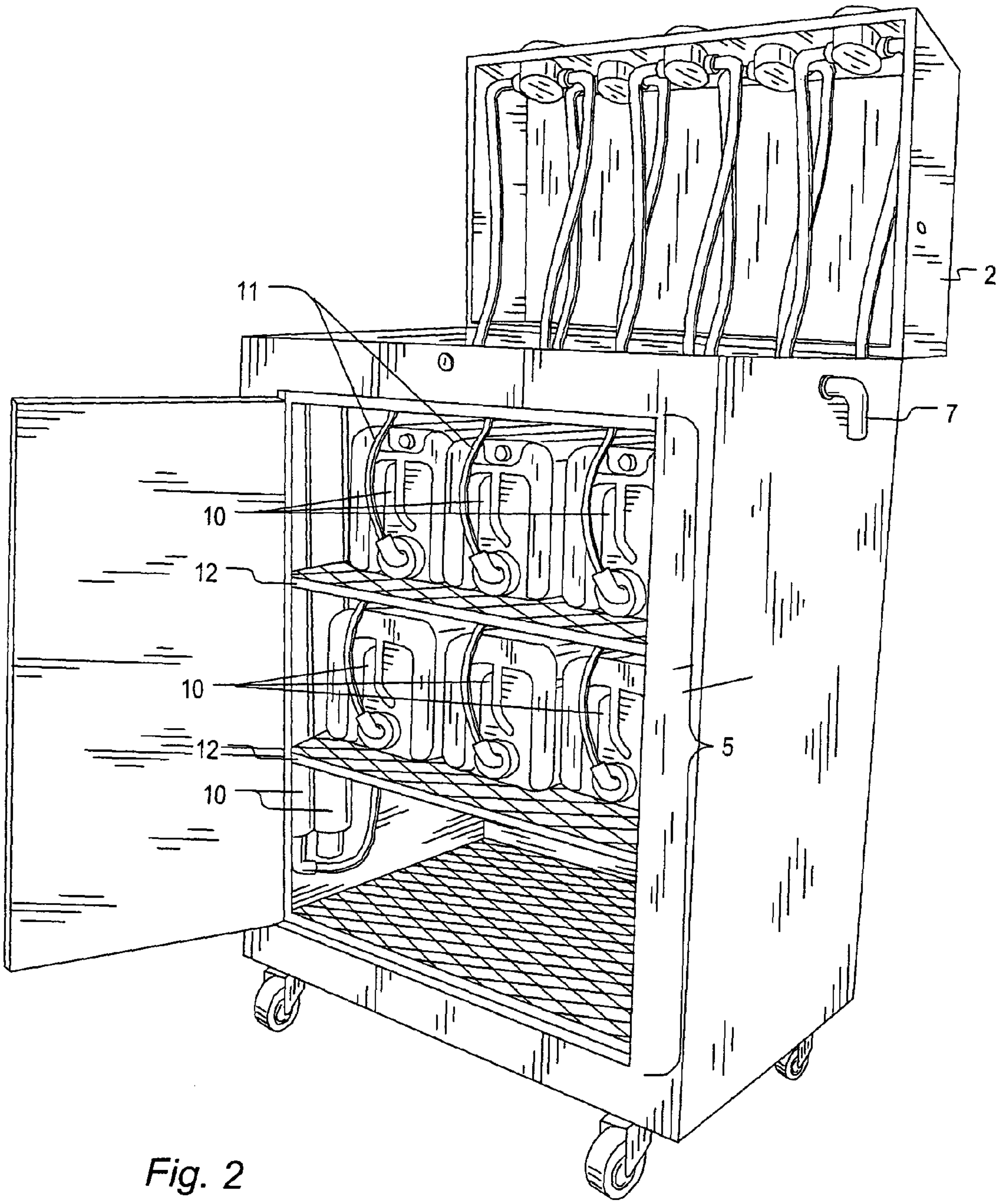
FIG. 2 depicts the inside of the embodiment of the apparatus of FIG. 1.

In FIG. 2, top cabinet 2 and main cabinet 5 are shown with open doors. A base fluid may be disposed in container 10. Container 10 may be located in main cabinet 5. Tube 11 may be coupled to container 10 and provide a path for the base fluid to enter top cabinet 2. Tube 11 and container 10 may be made of materials chemically inert with respect to the base fluid. Tube 11 may be made, for example, from rubber, polymeric material, and/or metal. Tube 11 may be permanently or removably coupled to container 10.

In an embodiment, tube 11 may be made of vinyl tubing (e.g., Tygon® tubing). Container 10 may be made of an inert polymeric material. Containers 10 may be placed on shelves 12. Shelves 12 may be perforated to allow for spilled or leaked fluid to be collected and removed at bottom of main cabinet 5. A perforated shelf may also be used to separate top cabinet 2 from main cabinet 5, allowing fluid spilled or leaked from the top cabinet to be collected and removed at the bottom of the main cabinet. In one embodiment, up to approximately 5 gallons of base fluid may be disposed in container 10. Container 10 may comprise a variety of shapes.

The base fluid may be any fluid used as a component for an automotive appearance care product. The base fluid may be a cleaning agent or a surfactant. Examples of a surfactant may be a nonionic surfactant, a cationic surfactant, a siloxane polymer surfactant, or an organosiloxane polymer surfactant. A nonionic surfactant may include nonylphenol ethoxylates, octylphenol ethoxylates, and/or ethoxylated alcohols. A cationic surfactant may be, for example, a quaternary ammonium compound. An example of a siloxane polymer surfactant may be dimethylpolysiloxane. A surfactant may also be an anionic surfactant such as a linear alkyl sulfonate.

The base fluid may be a wetting agent. Wetting agents may include fatty acid salts, long chain (between about 12 and about 20 carbon atoms) alcohols, or sodium alkyl sulfates. An example of a sodium alkyl sulfate is sodium lauryl sulfate.

The base fluid may be an emulsifier. An emulsifier may be a surface-active agent that reduces interfacial tension between a continuous phase and a dispersed phase in an emulsion. An example of an emulsifier may be coconut fatty acid amide or another alkanolamide.

The base fluid may be a glycol ether. Examples of glycol ethers include 2-butoxyethanol, propylene glycol monobutyl ether, and dipropylene glycol monobutyl ether.

The base fluid may be an acid. Examples of acidic base fluids include phosphoric, sulfuric, or sulfonic acids. The base fluid may be a glass cleaner. A glass cleaner may be a combination of alcohol, surfactant, and water. The base fluid may also include petroleum distillates, acrylic fluoropolymer resins, aliphatic hydrocarbons, or alcohols. The base fluid may be a foaming agent. In some embodiments, the base fluid may include fragrance and/or dye.

Figure 3:
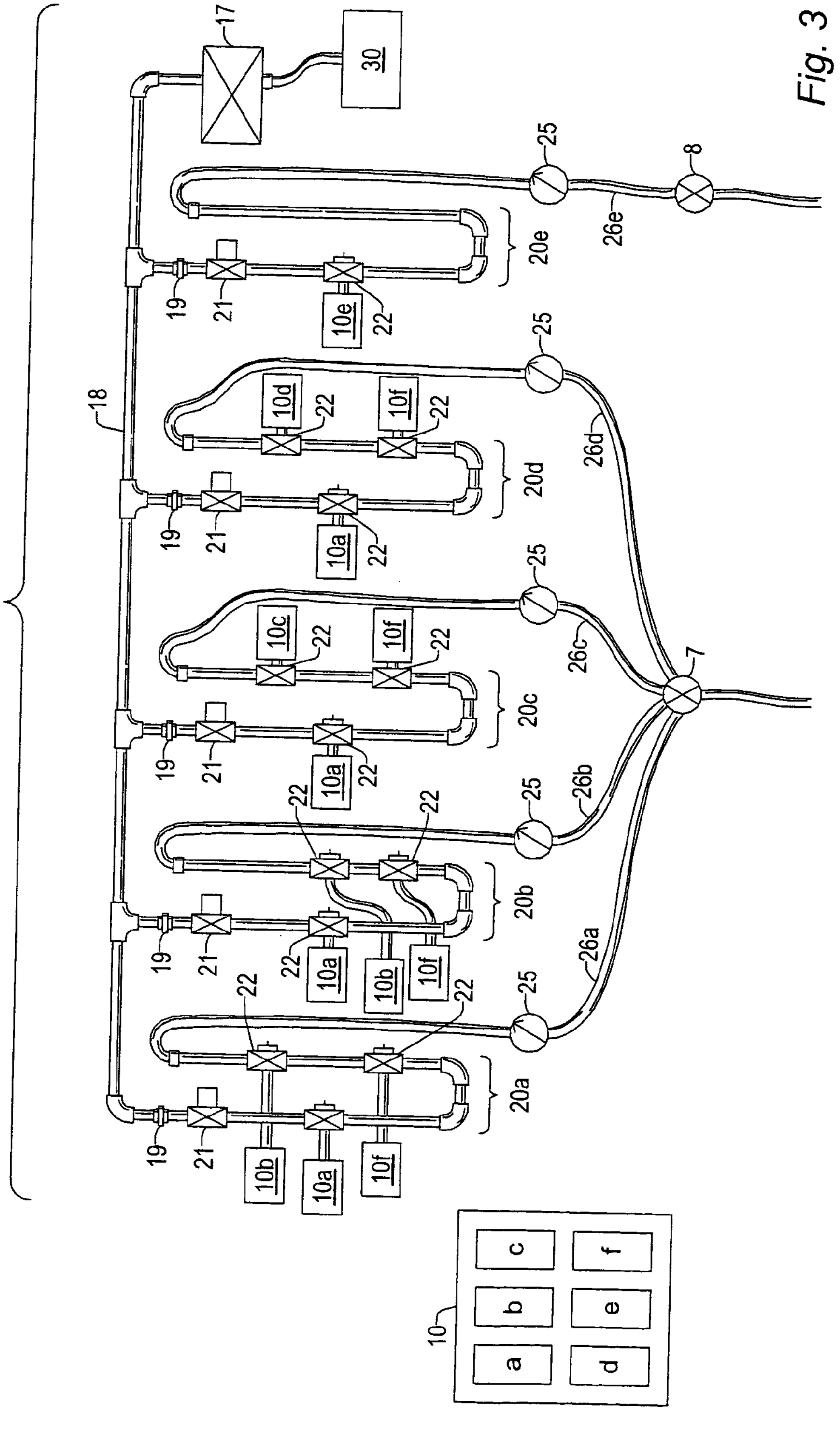
FIG. 3 illustrates a schematic of an embodiment of a system for dispensing a plurality of automotive appearance care products.

A system for mixing at least one base fluid with a carrier fluid to form an automotive appearance care product fluid may be disposed in top cabinet 2. A schematic for an embodiment of system 15 for injecting at least one base fluid into the carrier fluid to form a plurality of automotive appearance care product fluids is shown in FIG. 3. Carrier fluid supply 30 (e.g., water) may be coupled to first conduit 18 using methods well known in the art. Using an external carrier fluid supply 30 may reduce a size of apparatus 1, thus, allowing for a more compact and transportable system. The carrier fluid may be pumped to first conduit 18 using pump 17. Pump 17 may maintain a substantially constant fluid pressure in first conduit 18, regardless of a fluid pressure in carrier fluid supply 30. Thus, apparatus 1 may be moved from one location to another without modifications to the apparatus.

First conduit 18 may include copper tubing with a diameter of about ½ inch. A plurality of supply conduits 20*a*–20*e* may be coupled to first conduit 18 using suitable connectors 19. In the embodiment of FIG. 3, five supply conduits 20*a*–20*e* are coupled to first conduit 18 to provide five product fluids. However, other numbers of supply conduits 20 may be utilized to provide for a different number of product fluids based on a desired use of the dispensing apparatus.

Supply conduit 20 may include valve 21 coupled to first conduit 18. Valve 21 may allow a flow of the carrier fluid from first conduit 18 to supply conduit 20. Valve 21 may be, for example, a normally-closed valve. Valve 21 may be operated by switch 3 located outside of top cabinet 2, as depicted in FIG. 1. Each switch 3 may operate a separate valve 21 located in each of supply conduits 20*a*–20*e*. Valve 21 may be an electrically-operated solenoid valve or other type of valve (e.g., a pneumatically-operated solenoid valve). An example of valve 21 is an electrically-operated solenoid valve manufactured by DEMA Engineering (St. Louis, Mo.) and widely available through well-known valve distributor companies. Valve 21 may also be operated by a switch controlled by a computer system. If product fluids are chemically compatible, switches 3 may be operated simultaneously to combine product fluids to form a mixture of product fluids dispensed through exit valve 7. Alternatively, switches 3 may be controlled such that a user may not open more than one valve 21 at one time or controlled such that one switch may not be activated during the use of another switch, thereby allowing only one product fluid, or a specific mixture of product fluids, to be dispensed at a time.

Supply conduit 20 may include injector 22. Injector 22 may inject the base fluid into the carrier fluid. Injector 22 may be coupled to container 10 with tube 11 (shown in FIG. 2). Injector 22 may be a single-stage injector that utilizes the flow of carrier fluid to inject the base fluid into the carrier fluid to form the product fluid. An example of injector 22 is an injector manufactured by DEMA Engineering. A flow rate of the carrier fluid through injector 22 may be controlled by a flow rate of carrier fluid through valve 21. The flow rate of carrier fluid through valve 21 may be predetermined by the valve used. Multiple injectors 22 may be used in supply conduit 20 to inject multiple base fluids into the carrier fluid to form a product fluid. In an embodiment, each supply conduit 20*a*–20*e* is used to form one product fluid, respectively. In supply conduit 20 with multiple injectors 22, each injector may be coupled to a separate container 10.

In an embodiment, each container 10 may be coupled to multiple injectors 22 disposed in separate supply conduits 20*a*–20*e*. Each injector may inject a different amount of base fluid into the carrier fluid in each supply conduit. The amount of base fluid injected may be predetermined by a setting of the injector. This may be accomplished with the use of a "T" connector on tube 11 commonly used in the art of plumbing fluid lines. The "T" connector, or more than one "T" connector, may be located in main cabinet 5 (shown in FIG. 2) to divide tube 11 into multiple tubes coupled to multiple injectors 22. This may reduce the number of containers 10 needed in main cabinet 5.

Product fluid may flow through metering device 25 coupled to each supply conduit 20*a*–20*e*. Metering device 25 may determine an amount of product fluid dispensed from supply conduit 20 during use of apparatus 1. An example of metering device 25 is a Fill-Rite made by Tuthill Corporation (Burr Ridge, Ill.). The amount of product fluid dispensed may be determined as a total volume in gallons dispensed of product fluid. Metering device 25 may determine a total amount of product fluid dispensed from apparatus 1 during its lifetime, an "odometer" function. Metering device 25 may determine an amount of product fluid dispensed during a single use, or a specific number of uses, a "trip meter" function. In an embodiment, metering device 25 determines both "odometer" and "trip meter" amounts simultaneously and may show either amount on a display or on a computer coupled to the metering device. Monitoring the amount of product fluid dispensed may be used to determine a cost associated with the amount dispensed in order to charge the cost to an end user or other customer.

Supply conduits 20*a*–20*e* may be coupled to at least one exit valve 7 through exit conduits 26*a*–26*e*. Exit valve 7 may be used to dispense product to an external container or other such vessel. Coupling to exit valve 7 may be done by methods well known in the art. In some embodiments, a single exit valve 7 is used for product fluids that are chemically compatible. In an embodiment for chemically non-compatible product fluids, one or more additional exit valves may be used. In the embodiment of FIG. 3, two exit valves may be used. Exit valve 7 may be coupled to exit conduits 26*a*–26*d*. Exit valve 8 may be coupled to a exit conduit 26*e*. Exit conduit 26*e* may dispense a product fluid chemically non-compatible with product fluids dispensed through the exit conduits 26*a*, 26*b*, 26*c*, and 26*d*. An advantage of the system is the ability to dispense multiple product fluids from a single apparatus regardless of the chemical compatibility of the fluids.

Figure 4:
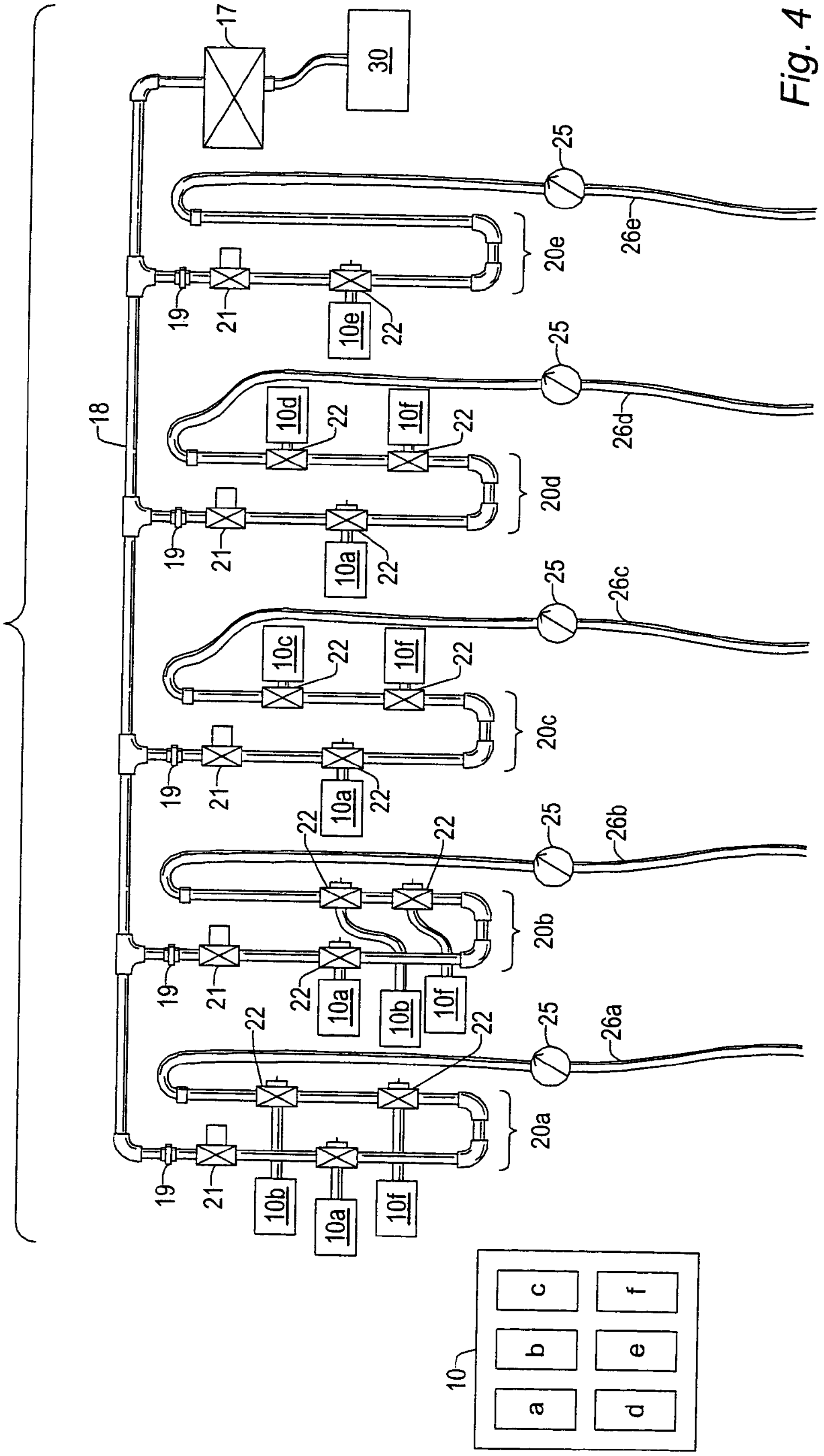
FIG. 4 illustrates a schematic of another embodiment of a system for dispensing a plurality of automotive appearance care products.

In an embodiment shown in FIG. 4, product fluids may be dispensed through exit conduits 26*a*–26*e*. Exit conduits 26 may be coupled to a variety of dispensing bodies, e.g., valves or spigots. Exit conduits 26 may be coupled to one or more dispensing bodies, or any combination thereof. A number and configuration of exit conduits 26 and dispensing bodies may be determined by a desired use of the system.

In an embodiment, the system may be used to dispense automotive appearance care products that are used in a high volume area. For example, a system for dispensing a plurality of product fluids may be used for processing approximately 150 to approximately 250 automobiles per day. Such a high volume location may be, for example, at an automobile auction. Products similar to those used in automotive appearance care may possibly be dispensed from a system used according to embodiments described herein.

Figure 5:
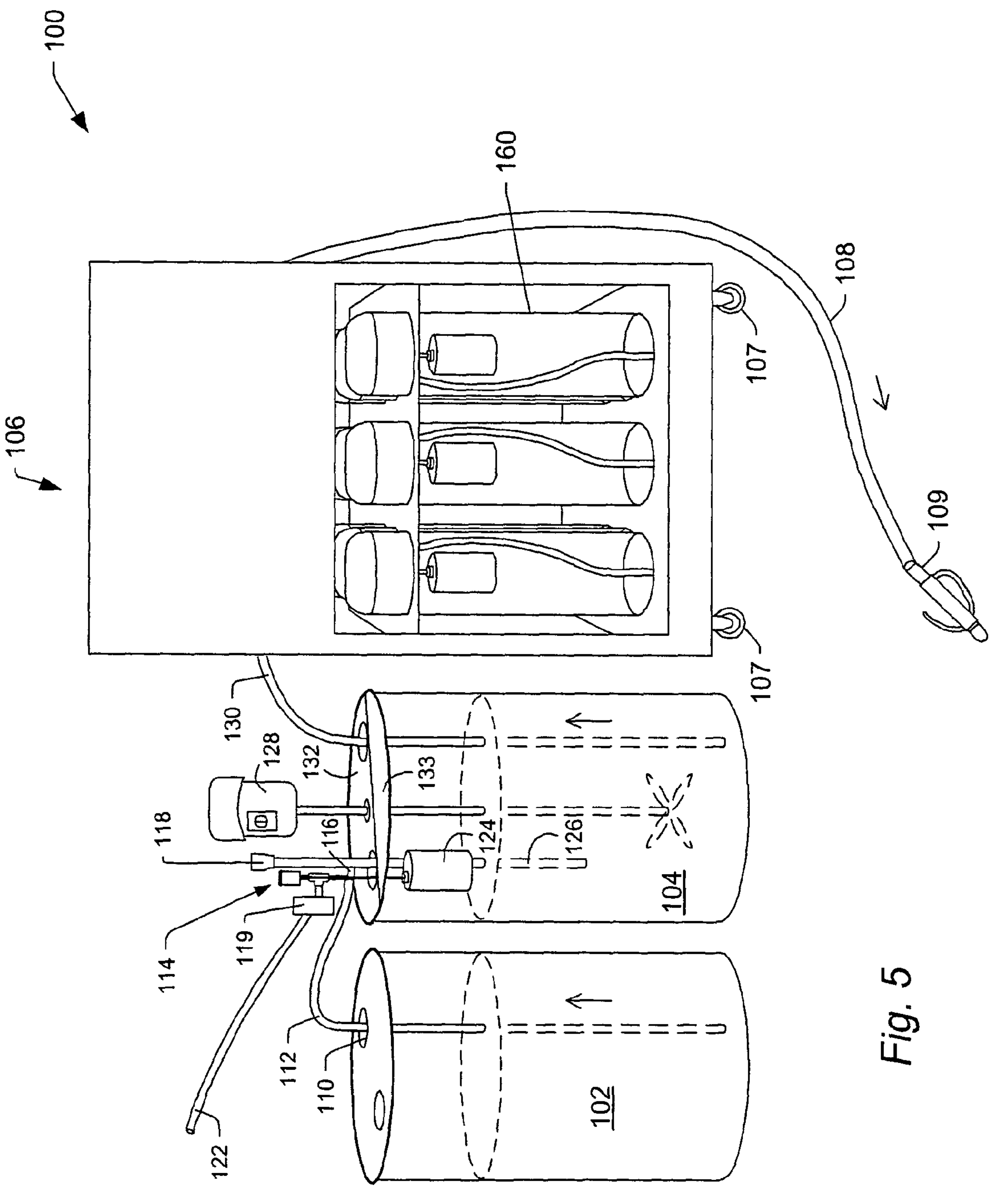
FIG. 5 depicts one embodiment of a system for dispensing a plurality of automotive appearance care products.

FIG. 5 depicts an embodiment of system 100 that may be used to dispense a plurality of automotive appearance care products. The system may have a plurality of storage containers 102 coupled to a plurality of mixing containers 104. Mixing containers 104 may be coupled to dispensing apparatus 106. Automotive appearance care products may be dispensed through one or more dispensing conduits 108. For clarity in the drawing, only one storage container 102, mixing container 104, and dispensing conduit 108 are shown. It is to be understood that any number of storage containers, mixing containers, and dispensing conduits may be used as described herein. In certain embodiments, the number of storage containers used is the same as the number of mixing containers used, with each storage container coupled to a single mixing container. For example, nine storage containers may be used with nine mixing containers.

Storage container 102 may contain a raw material. The raw material may include materials used as a base material for producing an automotive appearance care product. For example, the raw material may include a liquid concentrate of an automotive appearance care product. In an embodiment, storage container 102 is a 55 gallon drum containing a liquid concentrate. Storage container 102 may have opening 110. Conduit 112 may be placed in opening 110 and coupled to mixing container 104. In an embodiment, conduit 112 allows raw material to flow from storage container 102 to mixing container 104. In some embodiments, storage container 102 may be coupled to more than one mixing container 104 with one or more conduits (i.e., one storage container 102 may supply raw material to more than one mixing container 104). Conduit 112 may extend proximate bottom of storage container 102. Conduit 112 may include materials chemically inert to the liquid concentrate such as, but not limited to, PVC or polyethylene.

Figure 9:
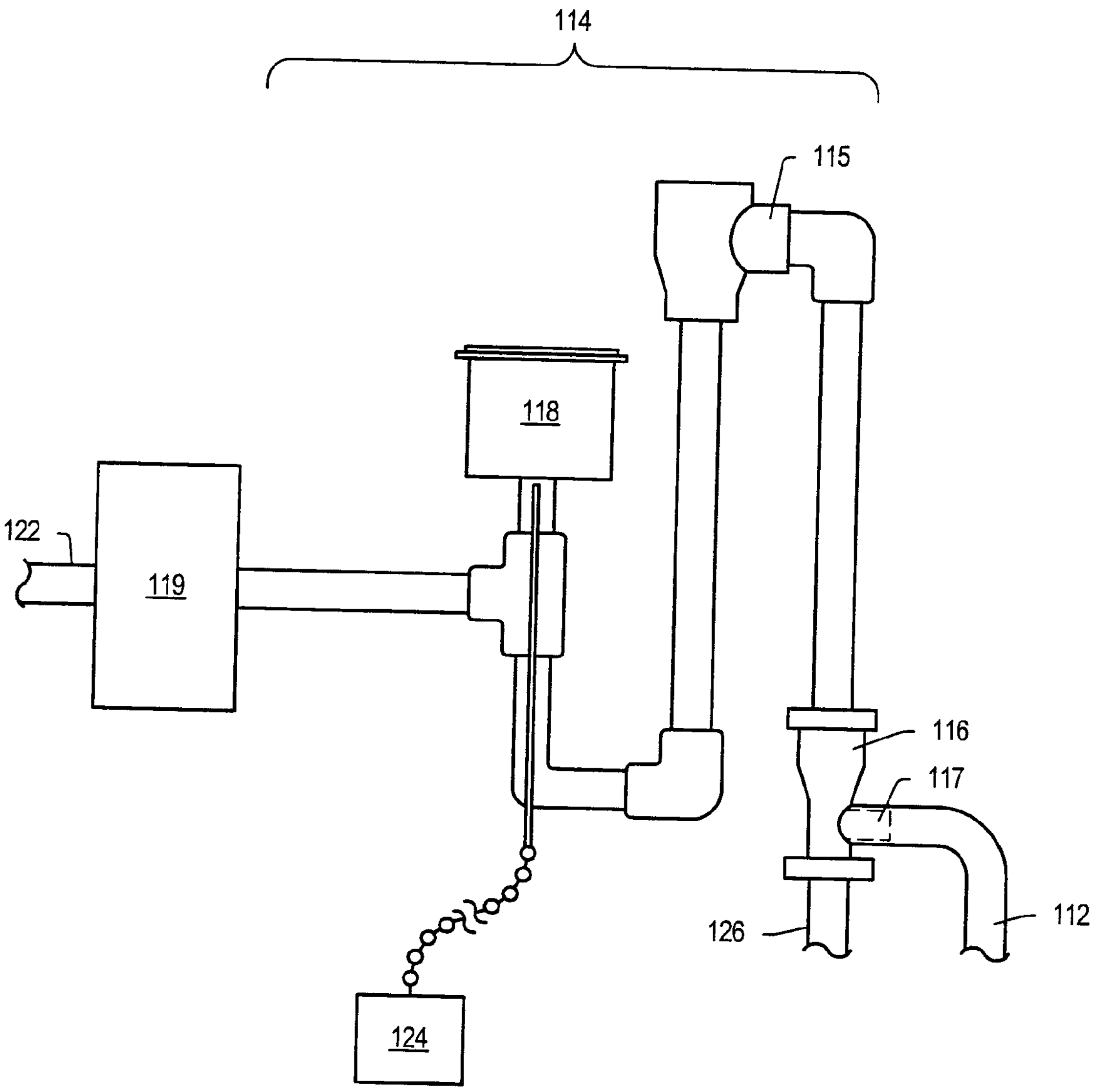
FIG. 9 depicts an embodiment of a mixing system.

Conduit 112 may be coupled to mixing system 114. Mixing system 114 may be coupled to mixing container 104. Mixing system 114 may be placed at or in an opening in cover 132 of mixing container 104. Mixing system 114 may include body 115, valve 118, mixing valve 116, and float 124, as shown in FIG. 9. Mixing system 114 may be a single unit obtainable from Hydro Systems Co. (Cincinnati, Ohio). In an embodiment, the mixing system is a Hydro Systems Co. HydroMinder Series Model 515. Valve 118 may be coupled to carrier fluid supply conduit 122. Valve 118 may be a magnetically operated valve. Carrier fluid supply conduit 122 may be further coupled to a carrier fluid supply. The carrier fluid supply may include a localized source of carrier fluid. For example, the carrier fluid supply may be a faucet, a tank, or a reservoir. In an embodiment, the carrier fluid is water.

When valve 118 is opened, carrier fluid may enter body 115 of mixing system 114 (shown in FIG. 9) through valve 118. The carrier fluid may flow through mixing valve 116. Mixing valve 116 may be, for example, a venturi valve. In some embodiments, mixing valve 116 may include an injector or a dilution tip. Mixing valve 116 may be used to combine carrier fluid with raw material from storage container 102, as shown in FIG. 5. In an embodiment, when carrier fluid flows through mixing system 114, mixing valve 116 siphons fluid from conduit 112. This siphoning may produce a flow of raw material through conduit 112. The raw material may be combined with carrier fluid in mixing valve 116. A proportion of raw material to carrier fluid produced by mixing valve 116 may be determined by a design of the mixing valve.

As shown in FIG. 9, valve 116 may include dilution tip 117. Dilution tip 117 for each mixing system 114 may be selected to provide a predetermined dilution ratio for a selected raw material. The dilution tip controls the flow rate of raw material (e.g., fluid) from storage container 102 (shown in FIG. 5) and through valve 116. Thus, selecting a desired dilution tip may be used to control the dilution ratio of a raw material when mixed with a carrier fluid. Dilution tips with various orifice sizes may be selected to set the dilution ratio at a desired value or in a desired range. For example, for a water-based dressing, a dilution tip may be selected to produce a dilution ratio of 1 part concentrated water-based dressing by volume and 2 parts water by volume. For a high performance car wash soap, a dilution tip may be selected to produce a dilution ratio of 1 part concentrated car wash soap by volume to 60 parts water by volume.

In certain embodiments, dilution tip 117 may be selected and/or installed by a distributor of the apparatus. The distributor of the apparatus may select the desired product fluids to be dispensed by the dispensing apparatus (and/or their corresponding raw materials), and select and/or install corresponding dilution tips for each valve 116. In some embodiments, a manufacturer or user of the dispensing apparatus may select and/or install the dilution tips for each valve 116.

The combined raw material and carrier fluid may flow through mixing valve 116 and to mixing container 104, as shown in FIG. 5. Conduit 126 may be coupled to mixing system 114 to provide the combined raw material and carrier fluid to mixing container 104. Mixing system 114 may include float 124. Float 124 may rise and fall with a level of fluid in mixing container 104. Float 124 may be used to turn on and/or off mixing system 114. The status (on or off) of mixing system 114 may be controlled by operation (i.e., opening or closing) of valve 118. A position of float 124 may cause valve 118 to open or close. In an embodiment, valve 118 is opened when float 124 falls below a lower specified height. Valve 118 may be closed when float 124 rises above an upper specified height.

In some embodiments, valve 119 may be coupled between valve 118 of mixing system 114 and carrier fluid supply conduit 122. Valve 119 may be a solenoid valve. Valve 119 may be either electrically or pneumatically operated. In an embodiment, valve 119 is a normally-closed solenoid valve. Valve 119 may be used to control the flow of carrier fluid between carrier fluid supply conduit 122 and mixing system 114. Closing valve 119 may inhibit the flow of carrier fluid to mixing system 114. Valve 119 may be operated by a switch. The switch may be controlled by a user or, in some embodiments, may be automatically controlled (e.g., by a computer or a timing device).

In some embodiments, a powder may be added to mixing container 104. Mixing container 104 may include cover 132 with lid 133. Lid 133 may be opened to allow for adding of a powder to mixing container 104. The powder may include a base material for producing an automotive appearance care product. An example of powder may include, but not be limited to, caustic soda. In some embodiments, powder may be added to mixing container 104 while valve 118 is open. In an embodiment, powder may be automatically added to mixing container 104 at a specified time. Powder may be added using an automated dispensing system. The automated dispensing system may be coupled (e.g., interlocked) with mixing system 114 to provide powder to mixing container 104 substantially simultaneously with carrier fluid and raw material dispensed by mixing system 114. Mixing container 104 may include materials substantially inert to carrier fluid, raw material, powder, and any combination thereof. For example, mixing container 104 may be a cylindrical polyethylene container obtainable from Chem-Tainer Industries (West Babylon, N.Y.).

Mixer 128 may be placed in mixing container 104. Mixer 128 may be a stirrer. For example, mixer 128 may be a four-bladed stirrer as shown in FIG. 5. Mixer 128 may be used to mix contents of mixing container 104 into a mixture. In an embodiment, mixer 128 is used to produce a mixture of raw material, carrier fluid, and powder in the mixing container.

In an embodiment, mixer 128 may be turned on and valve 119 opened substantially simultaneously. A switch may be used to provide power to mixer 128 and open valve 119 at substantially the same time. In certain embodiments, valve 119 is a solenoid valve that opens when power is applied to the valve (e.g., a normally-closed solenoid valve). In some embodiments, the switch may be coupled (e.g., interlocked) to float 124 such that power is not provided to valve 118 or mixer 128 until the float is above a specified height in mixing container 104. Mixer 128 and valve 119 may also be placed on a timing device (e.g., a clock timer) such that they operate for a specified time. In some embodiments, the timing device may be included in a switch. For example, the timing device may be set so that power is provided to mixer 128 and valve 119 for approximately 30 minutes or, in some embodiments, a time between about 20 minutes and about 40 minutes. The specified time may be determined by a time needed for substantially complete mixing of the contents of mixing container 104.

In some embodiments, float 124 may reach a specified height in mixing container 104, thus closing valve 118 in mixing system 114 before the timing device turns off power to mixer 128 and valve 119. For example, the specified height in the mixing container may be reached after a time less than the specified time of the timing device (e.g., about 10 minutes) while mixer 128 will run and valve 119 will be open for the specified time (e.g., about 30 minutes). In other embodiments, mixer 128 and valve 119 may be separately controlled by one or more timing devices. Using the mixer for a period of time after filling the mixing container may produce a more uniform mixture in the mixing container and, thus, a better product quality. In an embodiment, after the timing device turns off power to mixer 128 and valve 119, the flow of carrier fluid through valve 119 and to mixing system 114 may be reduced or stopped to inhibit unnecessary filling of mixing container 104. For example, inhibiting flow of carrier fluid through valve 119 may inhibit automatic filling of mixing container 104 with carrier fluid and raw material without adding powder to the mixing container (i.e., mixing container 104 cannot be filled with raw material and carrier fluid if float 124 opens valve 118 in mixing system 114 because there is no flow of carrier fluid through valve 119). Controlling the flow of carrier fluid may also allow for control of the production of a mixture in a mixing container so that the mixture cannot be produced until a mixing container is substantially empty.

In some embodiments, contents of mixing container 104 may substantially mix without using mixer 128 (e.g., if the mixture contains only raw material and carrier fluid). The raw material and carrier fluid may be substantially mixed by mixing system 114. In such a case, a timing device or switch may be used to open and close valve 119 to control the flow of carrier fluid as described herein.

Figure 6:
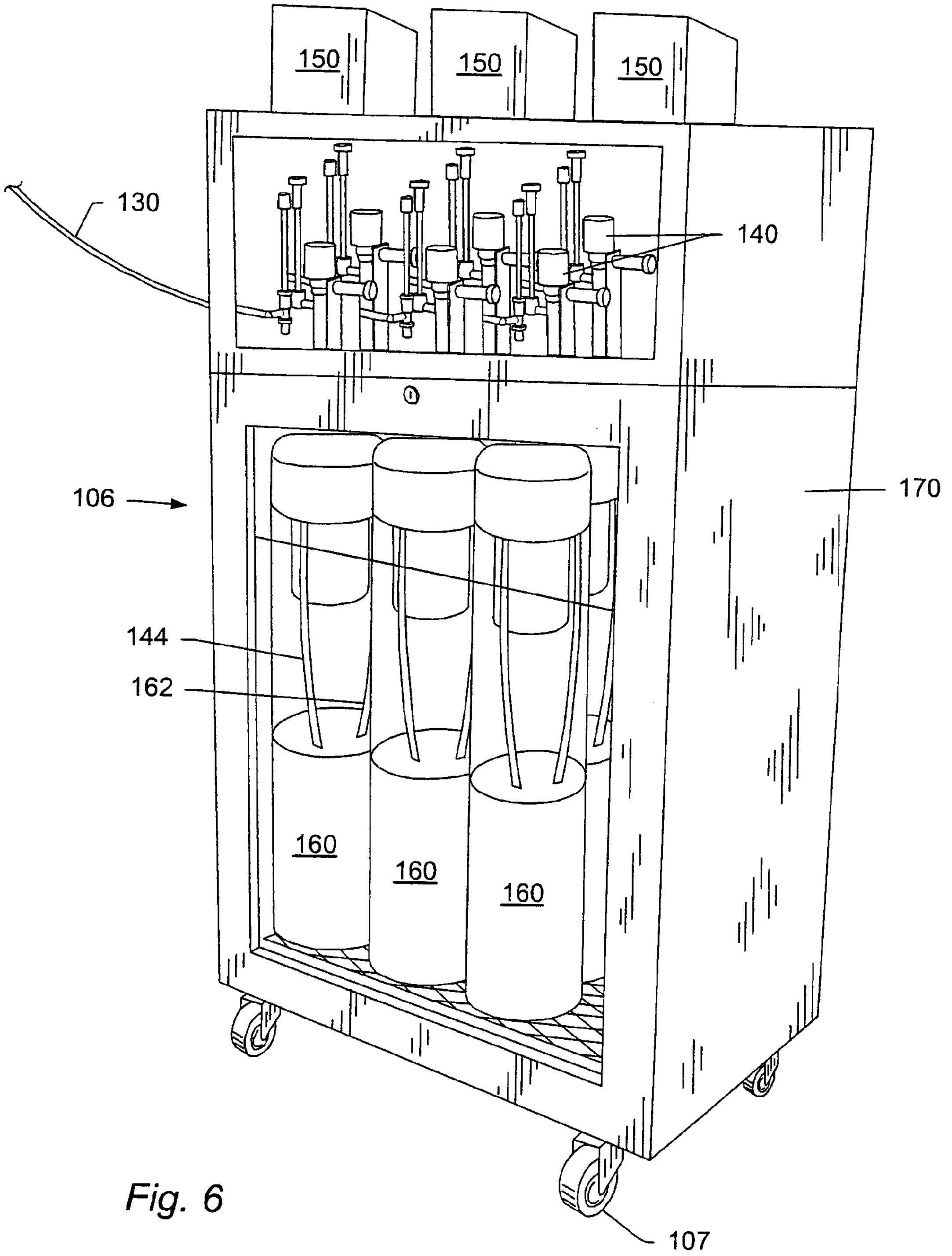
FIG. 6 depicts an embodiment of an apparatus used for dispensing a plurality of automotive appearance care products.

As shown in FIG. 5, mixing container 104 may be coupled to dispensing apparatus 106 by conduit 130. FIG. 6 depicts an embodiment of dispensing apparatus 106. Conduit 130 may be coupled to mixing system 140 in dispensing apparatus 106. Mixing system 140 may be similar to the embodiment of mixing system 114, as depicted in FIG. 9. In an embodiment, mixing system 140 is a Hydro Systems Co. HydroMinder Series Model 515.

One or more mixing systems 140 may be placed in an upper portion of dispensing apparatus 106 as shown in FIG. 6. However, a location of mixing system 140 may vary. In some embodiments, nine mixing systems may be placed in dispensing apparatus 106. Typically, a number of mixing systems may be equal to a number of mixing containers and storage containers with each mixing system coupled to one mixing container. However, mixing container 104, in some embodiments, may be coupled to more than one mixing system 140. One or more storage vessels 160 may be placed in a lower portion of dispensing apparatus 106. Each storage vessel 160 may be coupled to a mixing system 140 with conduit 144. In some embodiments, additional mixing systems may be coupled to each storage vessel 160. Additional mixing systems may be used to provide more than one mixture (e.g., mixtures from two or more mixing containers 104) to each storage vessel 160. Conduit 144 may substantially extend into a lower portion of storage vessel 160.

One or more pumps 150 may be placed in an upper portion of dispensing apparatus 106 above mixing systems 140. However, a location of pumps 150 may vary in dispensing apparatus 106. Each pump 150 may be coupled to a storage vessel 160 with conduit 162. In an embodiment, one pump 150 is coupled to each storage vessel 160, which is coupled to each mixing system 140. Thus, a number of pumps may typically be equal to a number of storage vessels and a number of mixing systems.

Figure 7:
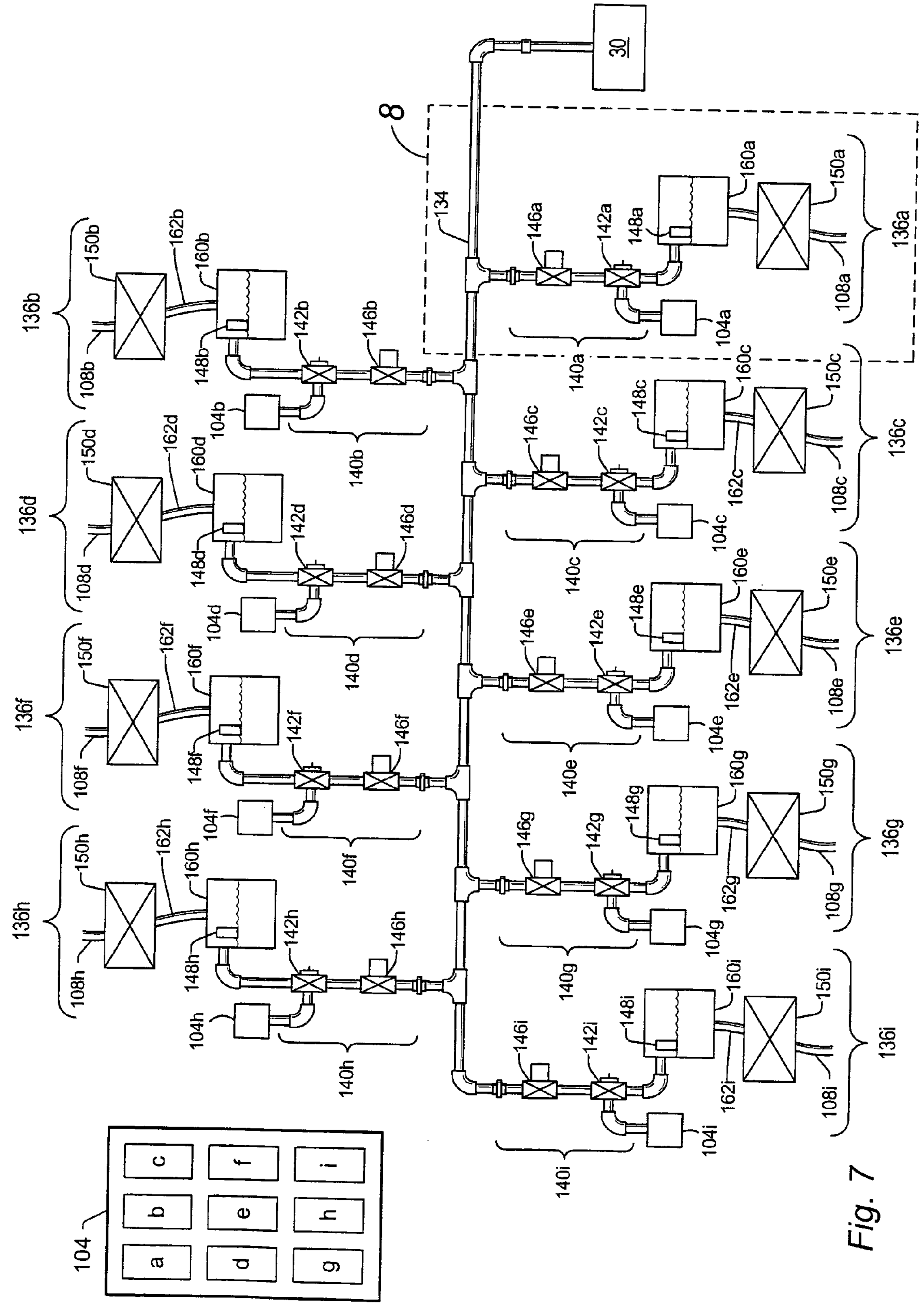
FIG. 7 illustrates a schematic of an embodiment of a system for dispensing a plurality of automotive appearance care products.

FIG. 7 illustrates a schematic of an embodiment of dispensing apparatus 106. FIG. 7 illustrates an embodiment with nine supply systems 136*a*–136*i* branched from carrier fluid supply conduit 134. However, a number of supply systems may be varied depending on, for example, a desired use of dispensing apparatus 106. Carrier fluid supply 30 may be coupled to carrier fluid supply conduit 134. Carrier fluid supply 30 may be located outside of dispensing apparatus 106. For example, carrier fluid supply 30 may be a faucet, a tank, or a reservoir. Carrier fluid supply conduit 134 may be branched so as to couple to each supply system 136*a*–136*i*. Mixing containers 104*a*–104*i* may be coupled to each respective supply system 136*a*–136*i* (i.e., mixing container 104*a* is coupled to supply system 136*a*, mixing container 104*b* is coupled to supply system 136*b*, etc.). However, in certain embodiments, a mixing container may be coupled to more than one supply system. In some embodiments, more than one mixing container may be coupled to a single supply system. Thus, two or more mixtures produced in the mixing containers may be combined in the single supply system.

Figure 8:
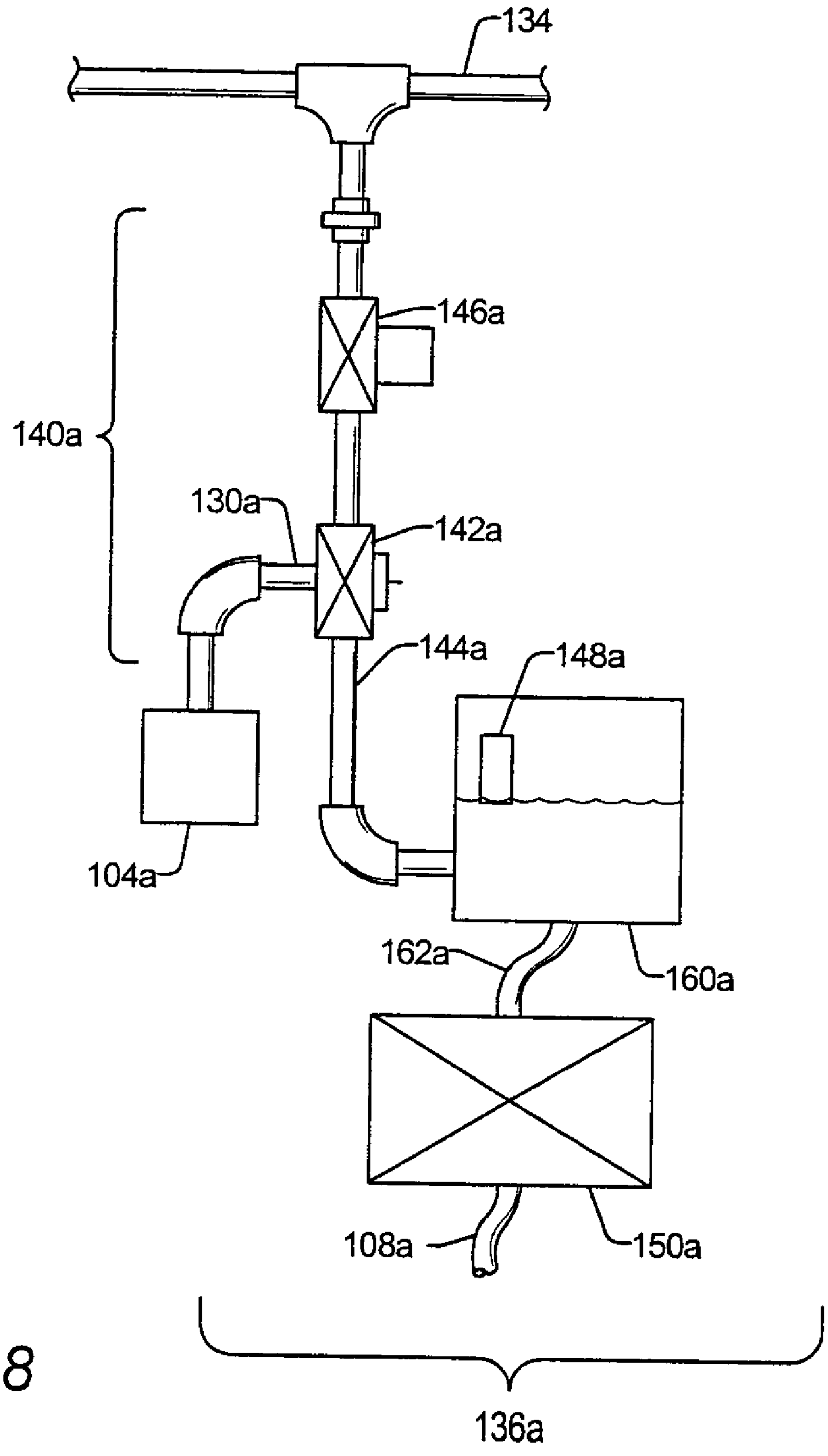
FIG. 8 illustrates a schematic of an embodiment of a supply system for dispensing an automotive appearance care product.

FIG. 8 illustrates a schematic of an embodiment of supply system 136*a* branched from carrier fluid supply conduit 134. Each of supply systems 136*a*–136*i* shown in FIG. 7 may include elements substantially similar to the supply system described in the embodiment of FIG. 8.

Figure 12:
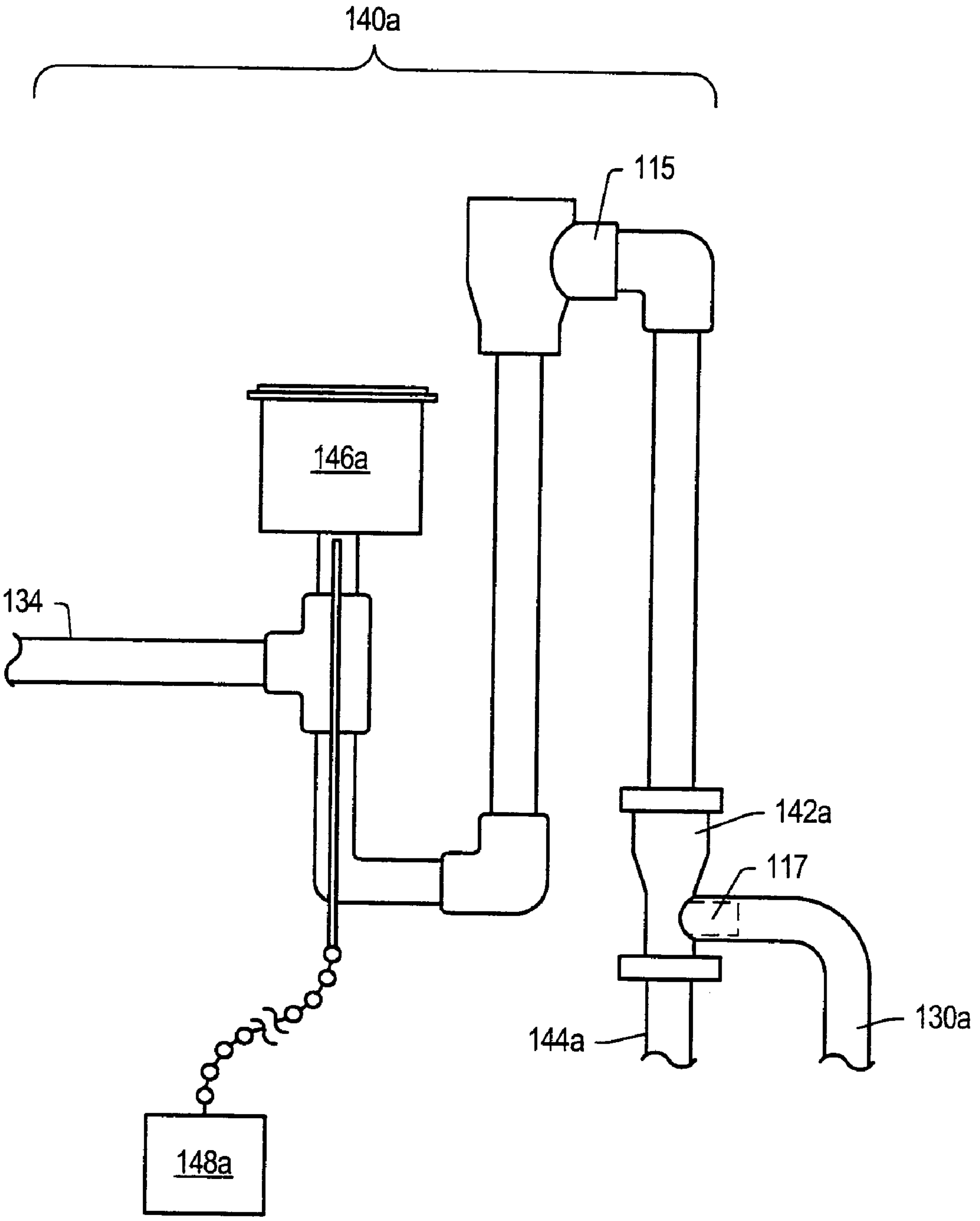
FIG. 12 depicts an embodiment of a mixing system.

As shown in FIG. 8, a branch of carrier fluid supply conduit 134 may be coupled to valve 146*a* of mixing system 140*a*. As shown in FIG. 12, mixing system 140*a* may include body 115, valve 146*a*, mixing valve 142*a*, and float 148*a*. Mixing system 140*a* may be a single unit obtainable from Hydro Systems Co. (Cincinnati, Ohio). In an embodiment, the mixing system is a Hydro Systems Co. Hydro-Minder Series Model 515. Valve 146*a* may be coupled to carrier fluid supply conduit 134. Valve 146*a* may be a magnetically operated valve. Carrier fluid supply conduit 134 may be further coupled to a carrier fluid supply. The carrier fluid supply may include a localized source of carrier fluid. For example, the carrier fluid supply may be a faucet, a tank, or a reservoir. In an embodiment, the carrier fluid is water.

When valve 146*a* is opened, carrier fluid may enter body 115 of mixing system 140*a* through valve 146*a*. The carrier fluid may flow through mixing valve 142*a*. Mixing valve 142*a* may be, for example, a venturi valve. In some embodiments, mixing valve 142*a* may include an injector or dilution tip. Mixing valve 142*a* may be used to combine carrier fluid with material from mixing container 104*a*, as shown in FIG. 8. In an embodiment, when carrier fluid flows through mixing system 140*a*, mixing valve 142*a* siphons fluid from conduit 130*a*. This siphoning may produce a flow of material through conduit 130*a*. The material may be combined with carrier fluid in mixing valve 142*a*. A proportion of material to carrier fluid produced by mixing valve 142*a* may be determined by a design of the mixing valve.

As shown in FIG. 12, valve 142*a* may include dilution tip 117. Dilution tip 117 for each mixing system 140*a* may be selected to provide a predetermined dilution ratio for a selected material. The dilution tip controls the flow rate of raw material (e.g., fluid) from mixing container 104*a* and through valve 142*a*. Thus, selecting a desired dilution tip may be used to control the dilution ratio of a raw material when mixed with a carrier fluid. Dilution tips with various orifice sizes may be selected to set the dilution ratio at a desired value or in a desired range.

The combined material and carrier fluid may flow through mixing valve 142*a* and to storage vessel 160*a* through conduit 144*a*, as shown in FIG. 8. Conduit 144*a* may be coupled to mixing system 140*a* to provide the combined material and carrier fluid to storage vessel 160*a*. Conduit 144*a* may substantially extend into storage vessel 160*a*. Storage vessel 160*a* may include materials that are substantially chemically inert to product fluid(s). For example, storage vessel 160*a* may include polymeric materials such as polyethylene.

Mixing system 140*a* may include float 148*a*. Float 148*a* may rise and fall with a level of fluid in storage vessel 160*a*. Float 148*a* may turn on and/or off mixing system 140*a*. The status (on or off) of mixing system 140*a* may be controlled by operation (i.e., opening or closing) of valve 146*a*. A position of float 148*a* may cause valve 146*a* to open or close. In an embodiment, valve 146*a* is opened when float 148*a* falls below a lower specified height. Valve 146*a* may be closed when float 148*a* rises above an upper specified height. This process may automatically open and close valve 146*a* based on a level of float 148*a* in storage vessel 160*a*. Thus, an automatic re-filling process for storage vessel 160*a* may be provided.

Conduit 162*a* may substantially extend into storage vessel 160*a* proximate a bottom of the storage vessel. Conduit 162*a* may couple storage vessel 160*a* to pump 150*a*. Any of the conduits described herein (e.g., conduit 162*a*, conduit 130, conduit 144*a*) may include, but not be limited to, substantially chemically inert materials such as polyethylene, PVC, etc.

Pump 150*a* may be used to pump product fluid from storage vessel 160*a* to dispensing conduit 108*a*. Pump 150*a* may be any pump that provides a pressure of product fluid to dispensing conduit 108*a*. In an embodiment, pump 150*a* is a diaphragm pump or a double diaphragm pump. For example, pump 150*a* may be an air-operated ARO ¼" non-metallic diaphragm pump available from Ingersoll Rand Co. (Woodcliff Lake, N.J.). Pump 150*a* may also be obtained from Flojet Corporation (Foothill Ranch, Calif.) (e.g., model number 5100-020 or model number G573205-Viton). Air may be supplied to pump 150*a* through an air supply conduit located in dispensing apparatus 106. The air supply conduit may include a central conduit with branches coupled to each pump 150*a*–150*i* in dispensing apparatus 106. A regulator may be coupled to the air supply conduit to control the pressure of air supplied to pump 150*a* (and other pumps 150). In an embodiment, the regulator may provide a pressure of about 40 psi to pump 150*a*. Other pressures may be used depending on, for example, a desired application of product fluids or a desired flow rate of product fluids. Pump 150*a* may be turned on by a user of dispensing apparatus 106. In some embodiments, pump 150*a* may be turned on by a switch located on dispensing apparatus 106. In certain embodiments, pump 150*a* (and pumps 150(*b–i*)) may run continuously with power supplied to dispensing apparatus 106.

Dispensing conduit 108*a* may be coupled to an outlet port of pump 150*a*. Fluid applicator 109 may be coupled to an end of dispensing conduit 108 (as shown in FIG. 5). Fluid applicator 109 may be coupled (e.g., interlocked) to turn on pump 150*a* when the fluid applicator is used. Fluid applicator 109 may be a sprayer. In certain embodiments, fluid applicator 109 may be an adjustable spray nozzle. In an embodiment, fluid applicator 109 may have user selectable patterns that vary the spray pattern of a product fluid and/or the spray velocity of a product fluid. The user selectable patterns may be selected based on the type of product fluid being dispensed by fluid applicator 109 and/or the surface to which the fluid is being applied (e.g., the user may select a pattern that produces a fine mist or a pattern that produces a single stream). Fluid applicator 109 may be a TriggerJet® Spray Gun (available from TeeJet Mid-Tech West, Sioux Falls, S. Dak.). Fluid applicator 109 may be made of polypropylene plastic or one or more other suitable lightweight, chemically resistant materials. Using fluid applicator 109 to dispense automotive appearance care products (i.e., product fluids) from dispensing apparatus 106 may reduce or eliminate the use of spray bottles to apply these types of products. Reducing or eliminating the use of spray bottles may increase efficiency of applying product fluids (e.g., by reducing the time spent refilling bottles), save on chemical costs (e.g., due to less spilling and inaccurate mixing of fluids), and/or reduce cleanup of chemical waste.

In some embodiments, one or more additional dispensing conduits may be coupled to dispensing conduit 108*a*. In certain embodiments, a metering device (e.g., a metering device as described in the embodiment of FIG. 1) may be coupled to dispensing conduit 108*a*. The metering device may be used to determine an amount of product fluid dispensed. The amount of product fluid dispensed may be used to determine a cost for charging a user using system 100.

As shown in FIG. 6, dispensing apparatus 106 may be placed in cabinet 170. Cabinet 170 may include wheels 107. Cabinet 170 may be transportable. Dispensing apparatus 106 may be removably coupled to mixing container 104 so that dispensing apparatus 106 may be more easily transported and/or replaced if necessary. Dispensing apparatus 106 may be enclosed in cabinet 170 such that a user of the system cannot access the dispensing apparatus. User access may be restricted to on/off operation of dispensing apparatus 106. In certain embodiments, a user of the system may be limited to operating a switch that turns on a system to produce and dispense product fluids and/or to dispensing the product fluids by operating a fluid applicator or dispensing valve.

Figure 10:
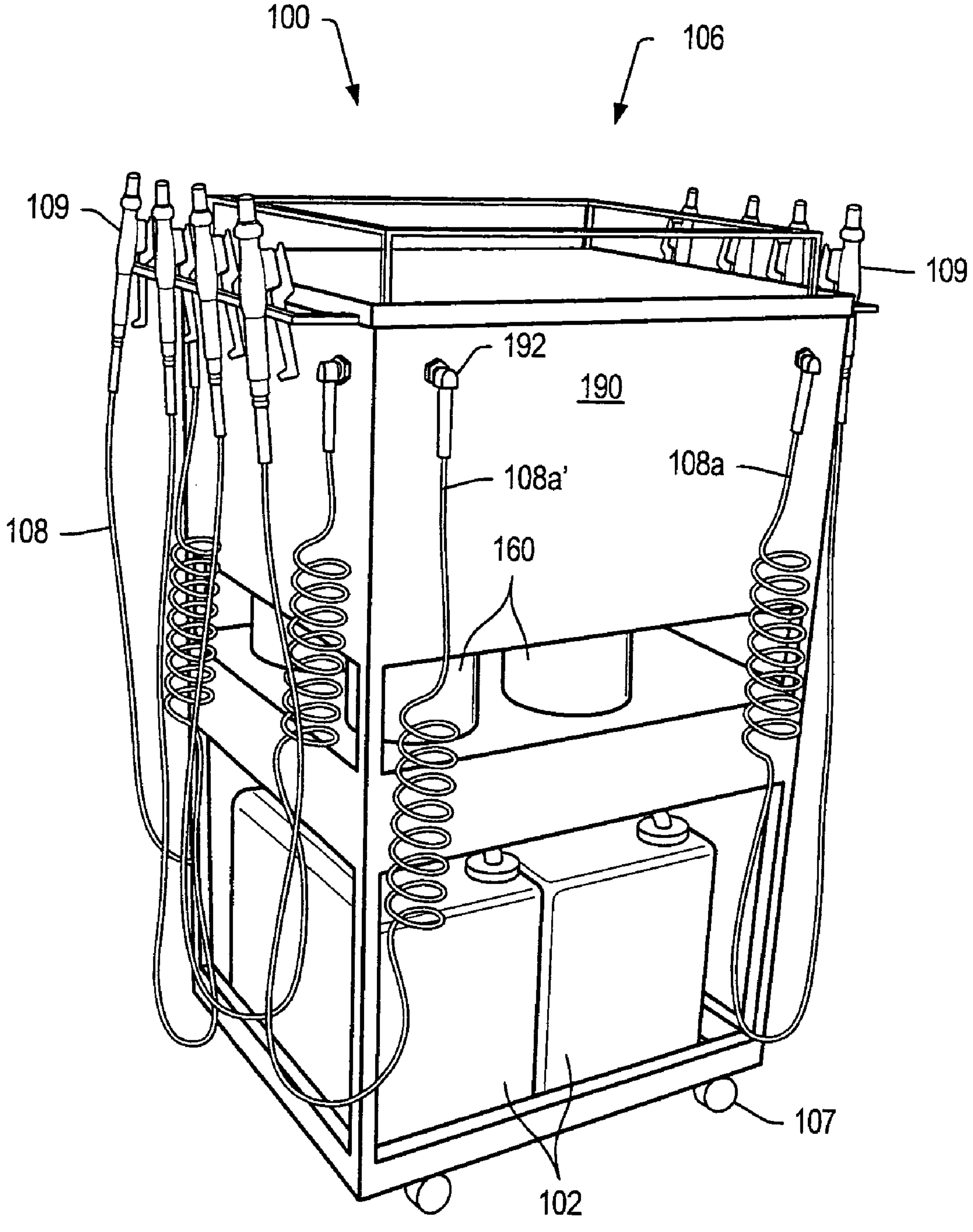
FIG. 10 depicts an embodiment of a dispensing apparatus.

FIG. 10 depicts an embodiment of system 100 that may be used to dispense a plurality of automotive appearance care products. System 100 may include dispensing apparatus 106. Storage containers 102 may be located in dispensing apparatus 106. In one embodiment, four storage containers 102 are located in dispensing apparatus 106. Any number of storage containers 102, however, may be located in dispensing apparatus 106 as desired by a manufacturer, distributor, or user of system 100. In some embodiments, storage containers 102 may be located outside of dispensing apparatus 106 (e.g., beside the dispensing apparatus or in a storage room).

Storage containers 102 may contain one or more raw materials. The raw materials may include materials used as a base material for producing an automotive appearance care product. For example, the raw material may include a concentrated form of an automotive appearance care product (e.g., a liquid concentrate). In an embodiment, each storage container 102 is a 5 gallon container containing one raw material or liquid concentrate. Larger storage containers may be used as desired depending on an application of system 100. Conduits 130 may be placed in storage containers 102 (shown schematically in FIG. 11). One conduit 130 may be placed in each storage container 102. Conduit 130 may extend proximate bottom of storage container 102. In certain embodiments, conduit 130 has a valve coupled to an end of the conduit placed in storage container 102 that allows fluid from the storage container to be drawn from the storage container while inhibiting backflow into the storage container. Conduit 130 may include materials such as, but not limited to, PVC or polyethylene that are chemically inert to a liquid concentrate. In certain embodiments, the material for each conduit 130 may be selected based on the type of fluid that will flow through the conduit.

Conduits 130 may be coupled to mixing systems 140. Each conduit 130 may be coupled to one mixing system 140. In some embodiments, more than one conduit 130 may be coupled to one mixing system 140 such that the mixing system combines two or more raw materials with a carrier fluid. Conduits 130 may couple to mixing systems 140 at valves 142 (as shown in FIGS. 11 and 12).

Figure 11:
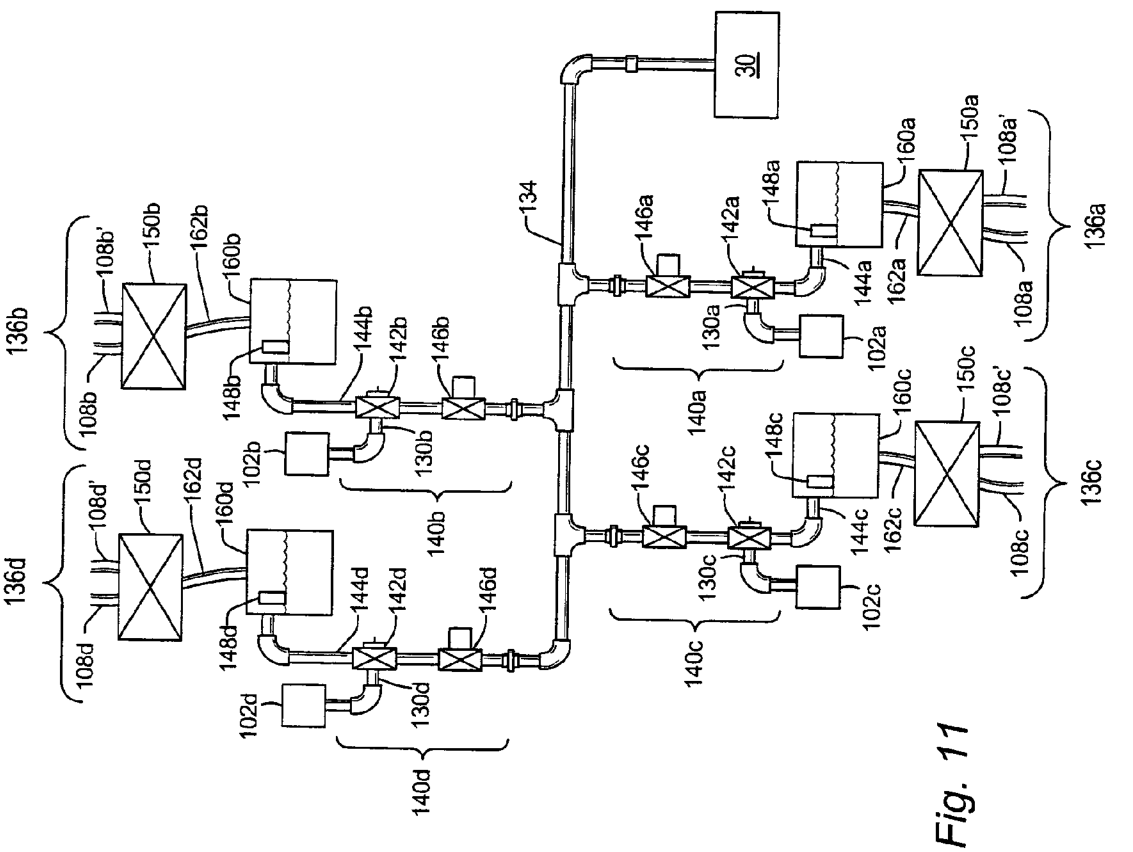
FIG. 11 depicts a schematic of an embodiment of a dispensing apparatus.

FIG. 11 illustrates a schematic of an embodiment of dispensing apparatus 106 shown in FIG. 10. FIG. 11 depicts a representation of a dispensing apparatus that produces four product fluids using four supply systems 136*a*–136*d* and dispenses each product fluid through two sets of dispensing conduits 108*a*–108*d* and 108*a*'–108*d*'. The embodiment shown in FIG. 11 is a representation of one possible embodiment. It is to be understood that any number of supply systems, mixing systems, pumps, dispensing conduits, etc., may be used.

Carrier fluid supply 132 may be coupled to supply systems 136(*a–d*). Carrier fluid supply 30 may be provided by a user of dispensing apparatus 106. Carrier fluid supply 30 may be removably coupled to carrier fluid supply conduit 134 using a quick-coupling connection. Using a quick-coupling connection to couple dispensing apparatus 106 to a carrier fluid supply and/or an air supply allows the dispensing apparatus to be mobile and transportable (e.g., transportable within a local area such as an automobile auction, transportable from user to user, or transportable from one location to another by a user).

Supply system 136*a* may include storage container 102*a*, mixing system 140*a*, storage vessel 160*a*, pump 150*a*, dispensing conduit 108*a*, and/or dispensing conduit 108*a*'. Supply systems 136*b*–136*d* may include similar components represented by corresponding reference numbers. Storage container 102*a* may be coupled to mixing system 140*a* with conduit 130*a*. Carrier fluid supply conduit 134 may provide carrier fluid (e.g., water) to mixing system 140*a*. In some embodiments, a regulator may be used to control a pressure of carrier fluid in carrier fluid supply conduit 134. Mixing system 140*a* may be coupled to storage vessel 160*a* with conduit 144*a*. Conduit 162*a* may couple storage vessel 160*a* to pump 150*a*. Dispensing conduit 108*a* and dispensing conduit 108*a*' may be coupled to pump 150*a*. Dispensing conduit 108*a* and dispensing conduit 108*a*' may dispense identical product fluid from storage vessel 160*a*. In certain embodiments, dispensing conduit 108*a* and dispensing conduit 108*a*' may be useable on different sides of dispensing apparatus 106, as shown in FIG. 10.

As shown in FIG. 11, a branch of carrier fluid supply conduit 134 may be coupled to valve 146*a* of mixing system 140*a*. As shown in FIG. 12, mixing system 140*a* may include body 115, valve 146*a*, mixing valve 142*a*, and float 148*a*. Mixing system 140*a* may be a single unit obtainable from Hydro Systems Co. (Cincinnati, Ohio). In an embodiment, the mixing system is a Hydro Systems Co. Hydro-Minder Series Model 515. Valve 146*a* may be coupled to carrier fluid supply conduit 134. Valve 146*a* may be a magnetically operated valve. Carrier fluid supply conduit 134 may be further coupled to a carrier fluid supply. The carrier fluid supply may include a localized source of carrier fluid. For example, the carrier fluid supply may be a faucet, a tank, or a reservoir. In some embodiments, a check valve may be coupled to the carrier fluid supply conduit (e.g., between a supply system and the carrier fluid supply conduit). The check valve may inhibit backflow of concentrated fluids into the carrier fluid supply conduit and/or the carrier fluid supply. In an embodiment, the carrier fluid is water.

When valve 146*a* is opened, carrier fluid may enter body 115 of mixing system 140*a* through valve 146*a*. The carrier fluid may flow through mixing valve 142*a*. Mixing valve 142*a* may be, for example, a venturi valve. In some embodiments, mixing valve 142*a* may include an injector or dilution tip. Mixing valve 142*a* may be used to combine carrier fluid with raw material from storage container 102*a*, as shown in FIG. 11. In an embodiment, when carrier fluid flows through mixing system 140*a*, mixing valve 142*a* siphons fluid from conduit 130*a*. This siphoning may produce a flow of raw material through conduit 130*a*. The raw material may be combined with carrier fluid in mixing valve 142*a*. A proportion of raw material to carrier fluid produced by mixing valve 142*a* may be determined by a design of the mixing valve.

As shown in FIG. 12, valve 142*a* may include dilution tip 117. Dilution tip 117 for each mixing system 140*a* may be selected to provide a predetermined dilution ratio for a selected raw material. The dilution tip controls the flow rate of raw material (e.g., fluid) from storage container 102*a* and through valve 142*a*, as shown in FIG. 11. Thus, selecting a desired dilution tip may be used to control the dilution ratio of a raw material when mixed with a carrier fluid. Dilution tips with various orifice sizes may be selected to set the dilution ratio at a desired value or in a desired range. For example, for a water-based dressing, a dilution tip may be selected to produce a dilution ratio of 1 part concentrated water-based dressing by volume and 2 parts water by volume. For a high performance car wash soap, a dilution tip may be selected to produce a dilution ratio of 1 part concentrated car wash soap by volume and 60 parts water by volume.

In certain embodiments, dilution tip 117 may be selected and/or installed by a distributor of the apparatus. The distributor of the apparatus may select the desired product fluids and/or corresponding raw materials to be dispensed by the dispensing apparatus and select and/or install corresponding dilution tips for each valve 142*a*. In some embodiments, a manufacturer or user of the dispensing apparatus may select and/or install the dilution tips for each valve 142*a*.

The combined raw material and carrier fluid may flow through mixing valve 142*a* and to storage vessel 160*a* through conduit 144*a*, as shown in FIG. 11. Conduit 144*a* may be coupled to mixing system 140*a* to provide the combined raw material and carrier fluid to storage vessel 160*a*. Conduit 144*a* may substantially extend into storage vessel 160*a*. Storage vessel 160*a* may include materials that are substantially chemically inert to product fluid(s). For example, storage vessel 160*a* may include polymeric materials such as polyethylene.

Mixing system 140*a* may include float 148*a*. Float 148*a* may rise and fall with a level of fluid in storage vessel 160*a*. Float 148*a* may turn on and/or off mixing system 140*a*. The status (on or off) of mixing system 140*a* may be controlled by operation (i.e., opening or closing) of valve 146*a*. A position of float 148*a* may cause valve 146*a* to open or close. In an embodiment, valve 146*a* is opened when float 148*a* falls below a lower specified height. Valve 146*a* may be closed when float 148*a* rises above an upper specified height. This process may automatically open and close valve 146*a* based on a level of float 148*a* in storage vessel 160*a*. Thus, an automatic re-filling process for storage vessel 160*a* may be provided.

As shown in FIG. 11, mixing systems 140 may combine raw materials from storage containers 102 with a carrier fluid (e.g., water) to produce one or more product fluids. Mixing systems 140 may be coupled to storage vessels 160. Product fluids produced in mixing systems 140 may flow to storage vessels 160. Floats 148 may be located in storage vessels 160 to turn on and/or off mixing systems 140 as described herein. In certain embodiments, storage vessels 160 have visibly transparent walls that allow a viewer (e.g., a user or distributor of dispensing apparatus 106) to view the interior of the storage vessels.

In certain embodiments, different product fluids may have different colors (e.g., different dyes may be added to the raw materials to produce different product fluid colors). The varying colors may be used to distinguish between product fluids in each storage vessel 160. The product fluids may also be colored to provide a visually stimulating display (i.e., aesthetically pleasing view) to a user of dispensing apparatus 106 or a customer. Storage vessels 160 with visibly transparent walls may allow a user to view the various colors of the product fluids and/or to view the level of the product fluid in each storage vessel. If there is a problem with a particular storage vessel (e.g., the storage vessel is not filling properly), the user may easily view and/or inspect the problem through a transparent wall. The user may then contact a distributor or manufacturer of dispensing apparatus 106 for help in correcting the problem.

Product fluids may be stored in storage vessels 160 until a user of the dispensing apparatus desires to dispense one or more product fluids. Storage vessels 160 may be automatically refilled by mixing systems 140 as described herein. In an embodiment, storage vessels 160 may have end caps that are removable from the bottom of the storage vessels. In some embodiments, the end caps may be removable only by a distributor or manufacturer of dispensing apparatus 106. The end caps may be removed to allow access to the inside of storage vessels 160 so that the storage vessels may be repaired, cleaned, etc.

As shown in FIG. 11, pumps 150 may be coupled to storage vessels 160 (e.g., with conduits 162). Pumps 150 may be used to pump (i.e., provide a flow of) product fluids from storage vessels 160 to dispensing conduits 108. Pump 150 may be any pump that provides a pressure of product fluid to dispensing conduit 108. For example, pump 150 may be an air-operated ARO ¼" non-metallic diaphragm pump available from Ingersoll Rand Co. (Woodcliff Lake, N.J.). Air may be supplied to pumps 150 through an air supply conduit located in dispensing apparatus 106. The air supply conduit may include a central conduit with branches coupled to each pump 150 in dispensing apparatus 106. A regulator may be coupled to the air supply conduit to control the pressure of air supplied to pumps 150. In an embodiment, the regulator may provide a pressure of about 40 psi to pumps 150. Other pressures may be used depending on, for example, a desired application of product fluids or a desired flow rate of product fluids. In certain embodiments, pumps 150 may run continuously with power and/or air supplied to dispensing apparatus 106. In an embodiment, a supply of air for dispensing apparatus 106 may be provided by a user of the apparatus (e.g., a house supply of air at a location for using the apparatus). The air supply conduit may include a quick-coupling connection for removably coupling the air supply conduit to a supply of air.

Dispensing conduits 108 may be coupled to pumps 150. In one embodiment, two dispensing conduits 108 are coupled to each pump 150. Coupling two dispensing conduits 108 to each pump 150 may allow each product fluid to be dispensed through each of the two conduits substantially simultaneously. Thus, dispensing apparatus may be used to provide product fluids simultaneously to more than one automobile (e.g., two automobiles at the same time). In certain embodiments, dispensing conduits 108 that dispense identical product fluids may be located so that the dispensing conduits 108 may be used on opposite sides of dispensing apparatus 106, or located so that more than one user can use the dispensing apparatus at one time. In an embodiment, four dispensing conduits used on one side of dispensing apparatus 106 (on a first automobile) may dispense four identical product fluids as four dispensing conduits used on another side of the dispensing apparatus (on a second automobile). Thus, dispensing apparatus 106 may be used to service two or more lanes of automobiles depending on a configuration of the dispensing apparatus.

As shown in FIG. 10, dispensing conduits 108 may be expandable (i.e., stretchable) hoses. Fluid applicators 109 may be coupled to dispensing conduits 108. Fluid applicators 109 may provide a flow of product fluid as described herein. Fluid applicators 109 may be operable to turn on and/or off dispensing of product fluids (i.e., control the flow of product fluids from storage vessels 160 during use). In some embodiments, fluid applicators 109 may have adjustable nozzles as described herein. In certain embodiments, one or more shut-off valves may be coupled to dispensing conduits 108. The shut-off valves may be used to stop the flow of fluid through the dispensing conduits (e.g., to allow cleanup or transport of the dispensing apparatus).

In an embodiment, portions of dispensing apparatus 106 may be placed in a housing. In one embodiment, the housing may be a cabinet. In certain embodiments, pumps 150, mixing systems 140, storage vessels 160, and storage containers 102 may be located in a housing. In some embodiments, any number and combination of pumps 150, mixing systems 140, storage vessels 160, and/or storage containers 102 may be located outside of a housing. The location of any of pumps 150, mixing systems 140, storage vessels 160, and storage containers 102 may depend on their size and/or use in dispensing apparatus 106. For example, for a large scale operation, storage containers 102 may be located outside of a housing (e.g., in a storage room) to accommodate storage containers that are large in size (e.g., 55 gallon drums).

In the embodiment depicted in FIG. 10, pumps, mixing systems, storage vessels 160, and storage containers 102 are located in housing 190. Dispensing apparatus 106 may include housing 190. In an embodiment, housing 190 may have wheels 107. Wheels 107 may allow housing 190 to be mobile and transportable. Housing 190 may have one or more levels for placing any of pumps, mixing systems, storage vessels 160, and/or storage containers 102. As shown in FIG. 10, storage containers 102 may be located in a lower section of housing 190, storage vessels 160 may be located in a middle section of the housing, and pumps and mixing systems may be located in an upper section of the housing. In certain embodiments, the section of housing 190 that includes pumps and/or mixing systems (e.g., the upper section) may be enclosed such that access to the section is limited. In some embodiments, pumps and/or mixing systems may be fixably coupled to housing 190. The pumps and/or mixing systems may be coupled (e.g., mounted) to a rack inside housing 190. The pumps and/or mixing systems may be coupled to the rack to inhibit movement of the pumps and/or mixing systems (e.g., during transport or moving of housing 190).

In one embodiment, the pumps and mixing systems may be enclosed in a section of housing 190 such that the pumps and mixing systems are accessible only to desired personnel (e.g., a distributor or manufacturer of dispensing apparatus 106). A section of the housing may be locked (e.g., by a cabinet key or locking panel) to limit access to the section. Access to the section containing the mixing systems may be limited to inhibit adjustment or replacement of, for example, dilution tips by unwanted personnel (e.g., a user). A user of dispensing apparatus 106 may only be allowed to access dispensing conduits 108 and fluid applicators 109. In certain embodiments, a user may be inhibited from accessing sections of the housing containing pumps, mixing systems, storage containers 102, and/or storage vessels 160. Limiting the access of a user to dispensing apparatus 106 may inhibit the user from, for example, misusing product fluids, wasting raw materials, damaging the dispensing apparatus, affecting mixing of raw materials and carrier fluid, etc. In some embodiments, a user may be allowed to replace storage containers 102. In other embodiments, only a distributor or manufacturer may be allowed to replace and/or refill storage containers 102. Only allowing the distributor or manufacturer to replace and/or refill storage containers 102 may inhibit placing the wrong raw materials in the dispensing apparatus and/or mis-aligning the raw materials in relation to their corresponding mixing system and storage vessel. Limiting access to dispensing apparatus 106 may also reduce the possibility of theft of materials.

Figure 13:
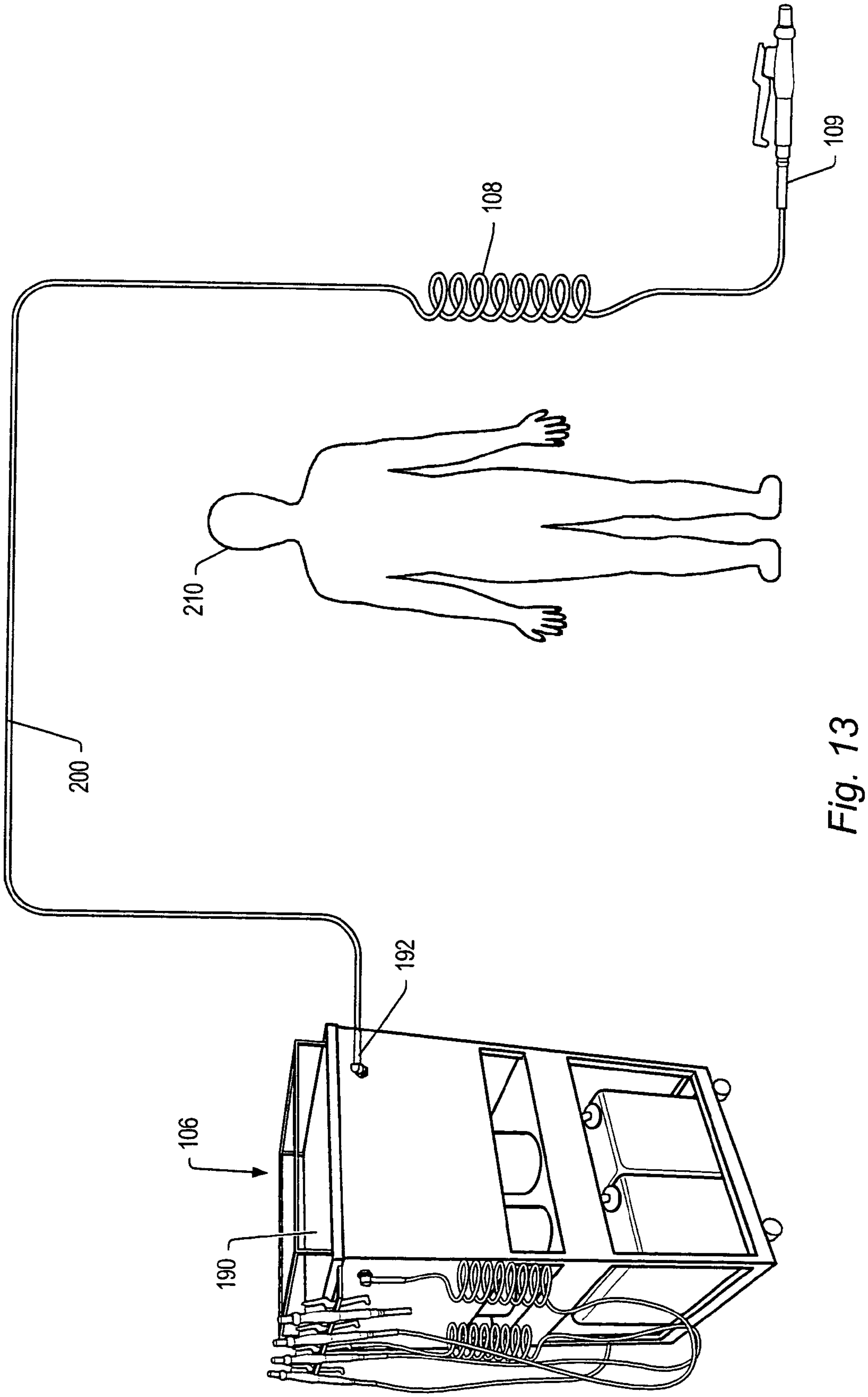
FIG. 13 depicts an embodiment of a dispensing apparatus and an overhead coupling system.

In certain embodiments, a housing for dispensing apparatus 106 may have a profile that is relatively small. The housing may have a profile in at least one direction (e.g., a horizontal width) that is less than about 18 inches. Having a relatively small profile may reduce the space taken up by dispensing apparatus 106. Housing 190 may, in some embodiments, be coupled to a wall or other support structure. Coupling the housing to a wall may also reduce the space taken up by the housing. In some embodiments, a dispensing apparatus housing may be coupled to a wall and include an overhead coupling system (as shown in FIG. 13). In some embodiments, a dispensing apparatus may be coupled to one side of a wall and dispensing conduits 108 may pass through the wall and be used on the other side of the wall.

In an embodiment, dispensing apparatus 106 may have a unique identifier or unique identification number. The unique identifier may be permanently located on housing 190 or dispensing apparatus 106. The unique identifier may be used to identify the apparatus to a manufacturer or distributor of the apparatus. For example, the unique identifier may be used to track the apparatus for leasing or selling purposes.

First ends of dispensing conduits 108 may be coupled to pumps 150, as shown in FIG. 11. Dispensing conduits 108 may pass through a wall of housing 190 using feedthrough 192, as shown in FIG. 10. The other end of dispensing conduits 108 (i.e., the dispensing ends) may be coupled to fluid applicators 109, as shown in FIG. 10. Fluid applicators 109 and/or dispensing conduits 108 may be removably coupled to housing 190. A fluid applicator and/or dispensing conduit may be removably coupled so that a user of the apparatus may grab the fluid applicator or dispensing conduit for use in dispensing product fluids in a desired manner. Dispensing conduits 108 may be expandable hoses to allow free movement of fluid applicators 109. In some embodiments, dispensing conduits 108 and/or fluid applicators 109 may be coupled to an overhead coupling system, as shown in FIG. 13. As shown in FIG. 10, fluid applicators 109 may be removably coupled to housing 109 by hanging on a rail, or other suitable ledge, on the housing for easy access by a user.

In some embodiments, dispensing conduits 108 and/or fluid applicators 109 may be labeled to display information about the product fluid that is dispensed through each dispensing conduit or fluid applicator. The information displayed may include, for example, what the product fluid is, safety information about the particular product fluid, dispensing directions, etc. A manufacturer or distributor of dispensing apparatus 106 may label the dispensing conduits and/or fluid applicators. For example, a distributor may label the dispensing conduits and/or fluid applicators after selecting a dispensing conduit that corresponds to a storage vessel and a dilution tip used to fill that storage vessel using a mixing system. Labeling the dispensing conduits and/or fluid applicators may, for example, inhibit use of the wrong product fluids by a user of the dispensing apparatus and/or reduce the likelihood of misuse of the product fluid.

Using dispensing apparatus 106 to produce product fluids for use as automotive appearance care products may reduce chemical costs because of reduced waste of material during filling of containers or mixing of fluids. Dispensing apparatus 106 may reduce labor costs by reducing or eliminating time involved with filling containers, mixing fluids, and cleanup or transport of materials. Dispensing apparatus 106 may also reduce problems associated with container storage, handling, and disposal.

In certain embodiments, storage containers 102 may be 5 gallon containers filled with raw materials. The raw materials may be liquid concentrates of product fluids as described herein. In an embodiment, dispensing apparatus 106 may be able to produce about 20 gallons of a product fluid before a 5 gallon storage container containing the raw material corresponding to the product fluid needs to be refilled or replaced with a new, full storage container (i.e., the storage container is substantially empty). In some embodiments, dispensing apparatus 106 may be able to produce about 30 gallons, about 40 gallons, about 50 gallons, about 60 gallons, about 70 gallons, or more of a product fluid before a 5 gallon storage container containing the raw material corresponding to the product fluid needs to be refilled or replaced with a new, full storage container. The amount of each product fluid producible from a storage container before refilling or replacing the storage container depends on factors including, but not limited to, volume of the storage container, concentration of the raw material, dilution ratio of the raw material in a carrier fluid, and amount of product fluid used per automobile.

Dispensing apparatus 106 may be able to produce a sufficient amount of product fluids so that a relatively large number of automobiles or vehicles may be treated before a storage container has to be refilled or replaced. The number of automobiles treatable may depend on, for example, the product fluid with the smallest amount of product fluid produced by dispensing apparatus 106. For a ratio of about 1 gallon of product fluid used to treat 8 automobiles, about 20 gallons of product fluid will treat about 160 automobiles before the storage container needs to be replaced or refilled. In some embodiments, greater than about 100 automobiles, greater than about 200 automobiles, greater than about 300 automobiles, or more may be treatable using dispensing apparatus 106 before a storage container has to be refilled or replaced. The number of automobiles treatable using dispensing apparatus 106 before refilling or replacing a storage container depends on factors including, but not limited to, volume of the storage container, the concentration of the raw material, the dilution ratio of the raw material in a carrier fluid, and the amount of product fluid used per automobile.

FIG. 13 depicts an embodiment of a dispensing apparatus coupled to an overhead coupling system. Dispensing apparatus 106 may include housing 190. Overhead coupling system 200 may be coupled to feedthroughs 192. Overhead coupling system 200 may include one or more conduits that couple to each feedthrough 192 on housing 190. Each conduit of overhead coupling system 200 may be used for one product fluid dispensed from dispensing apparatus 106. Each conduit may be coupled to a corresponding dispensing conduit 108 and corresponding fluid applicator 109 to dispense the proper product fluid from the dispensing conduit and fluid applicator. In some embodiments, dispensing conduit 108 may be included in overhead coupling system 200.

Overhead coupling system 200 may be coupled to a ceiling or any other appropriate supporting structure. Overhead coupling system 200 may be used to provide a space between housing 190 and fluid applicator 109, as shown in FIG. 13. The space may allow user 210 to stand or operate between housing 190 and fluid applicator 109. In some embodiments, the space may allow an automobile or other vehicle to pass or sit between housing 190 and fluid applicator 109. In an embodiment, housing 190 may be coupled to a wall. In certain embodiments, housing 190 may be coupled to one side of a wall and overhead coupling system 200 may be located on an opposite side of the wall. In some embodiments, the conduits in overhead coupling system 200 may pass through the wall or pass down through a ceiling or overhead structure.

In certain embodiments, dispensing apparatus 106 may be leased or sold to a distributor. The distributor may allow a user to use dispensing apparatus 106 through a user contract (e.g., a lease contract or other type of agreement). The distributor may provide the user dispensing apparatus 106 and raw materials for use in the dispensing apparatus. For example, the distributor may provide storage containers 102 with raw materials. In some embodiments, the distributor may provide a user with one or more dispensing apparatus 106 preloaded with full storage containers 102. The number of dispensing apparatus 106 provided to the user may be determined by the user's desired application (e.g., the estimated number of vehicles to be treated by the user). The user may be allowed to use dispensing apparatus 106 until his application is done or until the dispensing apparatus runs out of raw material. The dispensing apparatus may then be refilled, replaced with a new dispensing apparatus, or taken back by the distributor.

In an embodiment, a distributor may provide dispensing apparatus 106 to a user. The distributor may allow the user to operate the dispensing apparatus (i.e., operate the dispensing conduits and fluid applicators). In certain embodiments, the user may only be allowed to operate the fluid applicators on the dispensing apparatus. The distributor may transport dispensing apparatus 106 to a site for the user. The distributor may set the floats and select and install dilution tips for each dispensing apparatus based on the user's application. The distributor may also load and couple the storage containers to the dispensing apparatus. The user may need to provide an air supply and/or a carrier fluid (water) supply to operate the dispensing apparatus. The distributor may couple the dispensing apparatus to the air and carrier fluid supplies. In some embodiments, the user may couple the dispensing apparatus to the air and carrier fluid supplies. After coupling the air and carrier fluid supplies to the dispensing apparatus and setting the floats, selecting and installing the dilution tips, air and carrier fluid may be supplied to the dispensing apparatus to begin filling the storage vessels and prepare the dispensing apparatus for use. After use, the dispensing apparatus may be decoupled from the air and carrier fluid supplies and transported back to the distributor or to another location.

In some embodiments, a user may lease or buy a dispensing apparatus. For example, the user may desire to use the dispensing apparatus through many cycles of refilling or replacing the supply of raw materials, or over an extended period of time (e.g., over several years). The user may have a contract or agreement to operate the dispensing apparatus for a certain time period or until either the user, a distributor, or a manufacturer desires to terminate use of the dispensing apparatus. Typically, a manufacturer or distributor may be responsible for resupplying raw materials for the dispensing apparatus and/or maintaining (e.g., repairing, maintaining, etc.) the dispensing apparatus. In some embodiments, the user may be allowed to replace or refill the storage containers in the dispensing apparatus. Responsibilities associated with use and/or maintaining of the dispensing apparatus may be outlined in a contract or agreement between a user, a distributor, and/or a manufacturer.

In certain embodiments, a cost charged to a user by a distributor or manufacturer may be assessed, or determined, based on the number of automobiles, or vehicles, that are treated, or will be treated, with fluids provided by an automotive appearance care product dispensing system. The user may be charged on a cost per vehicle treated basis for use of the automotive appearance care product dispensing system. The cost per vehicle treated may be based on a set rate. The set rate may be based on the average amount of fluids needed, which may be estimated or predetermined, for each vehicle treated with automotive appearance care product fluids. The set rate may include other costs such as chemical or material costs, freight costs, labor costs, etc. In some embodiments, the set rate may be adjusted for each vehicle based on certain variables such as, but not limited to, a size of a vehicle (e.g., compact, mid-size, full-size, etc.), the vehicle manufacturer, and/or the vehicle model. The average amount of product fluids to be used for treating a vehicle may change based on these variables (e.g., a full-size vehicle may require more fluids than a compact vehicle). Thus, the set rate for treating a certain type of vehicle may be adjusted accordingly.

In an embodiment, the cost charged to a user may be assessed, or determined, as the set rate multiplied by the number of vehicles treated by the user with one or more automotive appearance care products. The set rate may be assessed (e.g., predetermined) for the user before the user utilizes the automotive appearance care product dispensing system. The set rate may be assessed or determined by a manufacturer of the dispensing system, and/or a supplier of the automotive appearance care products and/or base materials for the automotive appearance care products. In certain embodiments, the manufacturer of the dispensing system may also be the supplier of the automotive appearance care products or base materials for the automotive appearance care products.

In some embodiments, a set rate may be assessed or determined for each individual automotive appearance care product. Individual set rates for each automotive appearance care product may be used in combination to determine a cost to be charged to a user of the dispensing system. Individual set rates may be used, for example, when certain automotive appearance care products are not used for certain types of vehicles. As another example, some automotive appearance care products may be used at one location for using the dispensing system but not at a second location for using the dispensing system. Thus, the set rate may be adjusted between locations based on which automotive appearance care products will be used at each location.

Charging a cost to the user based on a set rate, or, in some embodiments, on more than one set rate, may reduce the number of costs a user of an automotive appearance care product dispensing system has to track and/or monitor during use. The user may only have to budget for the number and/or type of automobiles processed since costs such as chemical or material costs, freight costs, labor costs, etc., are already factored into the set rate for each vehicle processed. The user may not need to budget separately for these other types of costs, thereby simplifying bookkeeping, inventory, and/or other tasks associated with monitoring, tracking, or budgeting. This simplification may allow a user to operate a business (e.g., a car dealership, a detail shop, or a vehicle auction) or process more efficiently.

In certain embodiments, a cost charged to a user by a distributor or manufacturer may be assessed, or determined, based on a per application basis for the automotive appearance care product dispensing system. The user may be charged a cost for each application the user uses the dispensing system. In one embodiment, an application may be a one-time use of the dispensing system. In some embodiments, an application may be a use of a dispensing system until the system has to be refilled with raw materials or replaced because the system has run out of raw materials. In some embodiments, an application may be a predetermined time period for use of a dispensing system (e.g., a number of days or months).

The cost per application may be based on a set rate. The set rate may be based on the average or estimated amount of fluids needed for a predetermined application using the automotive appearance care product fluids. The set rate may include other costs such as chemical or material costs, freight costs, labor costs, etc. The set rate may be based on the costs of a full use of the dispensing system (e.g., the costs associated with transporting the dispensing system to and from the site, setup of the system, raw material costs for full storage containers, and other extraneous costs such as insurance or maintenance). The set rate for an application may include cost adjustments based on the types of raw materials used in the application. The set rate may also be adjusted based on the number of dispensing systems needed by the user.

Charging a cost to the user on a per application basis may reduce the number of costs a user of an automotive appearance care product dispensing system has to track and/or monitor during use. The user may only have to budget for the cost charged by a distributor or manufacturer on a per application, or per use, basis since costs such as chemical or material costs, freight costs, labor costs, etc., are already factored into the set rate per application. The user may not need to budget separately for other costs, thereby simplifying bookkeeping, inventory, and/or other tasks associated with monitoring, tracking, or budgeting. This simplification may allow a user to operate a business (e.g., a car dealer, a detail shop, or a vehicle auction) or process more efficiently.

In certain embodiments, a user of a dispensing system may receive a statement (or bill) of charges for using the dispensing system. The statement may outline the cost for using the dispensing system on a per vehicle or a per application basis. In some embodiments, the statement may include a breakdown of the costs associated with using a dispensing system (e.g., transportation, chemical costs, etc.).

In some embodiments, dispensing of the automotive appearance care products may be substantially automated. Automatically dispensing products may reduce excess use of materials or fluids by a user of the system. Automatically dispensing products may further simplify operation of the dispensing system and the business or process utilizing the dispensing system.

In certain embodiments, a dispensing system or apparatus may include or be coupled to a counting system. A counting system may count or record numbers or amounts of one or more selected factors used in determining costs charged for use of the dispensing system. Selected factors used in determining costs may include, but not be limited to, a number of vehicles treated, a number of applications using the dispensing system, a number of uses of the dispensing system, a number of times the dispensing system is refilled, an amount of fluid dispensed by the dispensing system, or an amount of time the dispensing system is used (e.g., time the system is turned on for). The counting system may automatically count or record the number or amount of a selected factor. In some embodiments, the counting system may be manually activated (e.g., manually incremented) to count or record the number or amount of a selected factor.

In certain embodiments, the counting system may provide a report of the number or amount of a selected factor. The report may be used to determine a fee for use of the dispensing system. A statement of the fee may be provided to a user of the dispensing system. In an embodiment, the counting system may automatically determine the fee for use of the dispensing system and provide a statement of the fee to a user.

Using the embodiment in FIG. 3, five automotive appearance care product fluids were dispensed by system 15. Six different base fluids were disposed in containers 10. A surfactant was disposed in container 10*a*. A first cleaning agent was disposed in container 10*b*. A foaming agent was disposed in container 10*c*. A second cleaning agent was disposed in container 10*d*. A glass cleaner was disposed in container 10*e*. A fragrance was disposed in container 10*f*. Water was supplied as the carrier fluid from an external faucet source.

A degreaser was produced in supply conduit 20*a*. The degreaser was formed by injection of surfactant from 10*a*, first cleaning agent from 10*b*, and fragrance from 10*f* into the water flowing from first conduit 18. Each injector 22 injected a predetermined amount of each base fluid (surfactant, first cleaning agent, or fragrance) into the flow of water. Injectors 22 were injectors manufactured by DEMA Engineering. Solenoid valve 21 controlled a flow rate of water from first conduit 18 to supply conduit 20*a*. An amount of degreaser dispensed was determined with metering device 25. Metering device 25 was a Fill-Rite from Tuthill Corporation. The degreaser was dispensed through exit valve 7.

Supply conduits 20*b*–20*d* operated in a similar manner producing different product fluids. An all-purpose cleaner was produced in supply conduit 20*b* from the injection of surfactant from 10*a*, first cleaning agent from 10*b*, and fragrance from 10*f*. A greater flow rate of water from first conduit 18 produced an all-purpose cleaner that was more dilute than the degreaser made from the same base fluids in supply conduit 20*a*.

Surfactant from 10*a*, foaming agent from 10*c*, and fragrance from 10*f* were combined in supply conduit 20*c* to form car wash soap. Surfactant from 10*a*, second cleaning agent from 10*d*, and fragrance from 10*f* were combined in supply conduit 20*d* to form a wheel cleaner. All product fluids formed in supply conduits 20*a*–20*d* were dispensed through exit valve 7. These product fluids were dispensed through the same valve 7 because of their chemical compatibility. The product fluids were dispensed at separate times through use of switches on a top panel of the housing of system 15. No system cleanup was necessary between dispensing of these fluids, although a brief initial dispensing period was beneficial to clean out fluid from the previous dispensing period. Metering devices 25 monitored a volume dispensed for each use and a total volume dispensed over time for each product fluid.

Glass cleaner from container 10*e* was injected into water in supply conduit 20*e* to form a more dilute glass cleaner. The glass cleaner was chemically non-compatible with fluids formed in supply conduits 20*a*–20*d* and therefore was dispensed through separate exit valve 8. Metering device 25 coupled to supply conduit 20*e* monitored a volume of glass cleaner dispensed.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for dispensing automotive appearance care product fluids, comprising:

dispensing a plurality of automotive appearance care product fluids from an apparatus, wherein the apparatus comprises:

a plurality of storage containers comprising one or more raw materials, wherein each storage container is configured to contain at least one raw material;

a plurality of mixing systems coupled to the plurality of storage containers, wherein the mixing systems are configured to combine one or more of the raw materials with a carrier fluid to produce a plurality of automotive appearance care product fluids during use;

a plurality of storage vessels coupled to the plurality of mixing systems, wherein each automotive appearance care product fluid is stored in one storage vessel;

a plurality of pumps coupled to the plurality of storage vessels, wherein each pump is coupled to at least one storage vessel, and wherein the plurality of pumps are configured to produce a flow of automotive appearance care product fluids from the storage vessels during use; and a plurality of dispensing conduits coupled to the plurality of pumps, wherein each of the dispensing conduits is coupled to at least one pump, and wherein the dispensing conduits are configured to dispense automotive appearance care product fluids during use;

treating one or more automobiles using the dispensed automotive appearance care product fluids; and receiving a statement of a fee for using the apparatus based on a number of automobiles treated using the automotive appearance care product fluids.

2. The method of claim 1, further comprising obtaining the apparatus from a distributor of the apparatus.

3. The method of claim 1, further comprising coupling the apparatus to a supply of carrier fluid.

4. The method of claim 1, further comprising coupling the apparatus to a supply of air.

5. The method of claim 1, wherein the fee statement is provided automatically by the apparatus.

6. The method of claim 1, wherein the fee statement for using the apparatus is based on a number of applications using the automotive appearance care product fluids.

7. The method of claim 1, wherein the fee statement for using the apparatus is based on a number of uses of the apparatus.

8. The method of claim 1, wherein the fee statement for using the apparatus is based on a number of times the apparatus is refilled with raw materials.

9. The method of claim 1, wherein the fee statement for using the apparatus is based on a specified period of time the apparatus is used.

10. The method of claim 1, wherein the plurality of raw materials are automatically combined with the carrier fluid in the apparatus to produce the plurality of product fluids.

11. The method of claim 1, wherein the plurality of raw materials are automatically combined with the carrier fluid to produce the plurality of product fluids by the plurality of mixing systems in the apparatus.

12. The method of claim 1, wherein the plurality of raw materials are automatically combined with the carrier fluid and automatically provided to the plurality of storage vessels in the apparatus.

13. The method of claim 1, wherein each of the plurality of storage vessels is automatically refilled with product fluid when a level of fluid in each storage vessel is below a selected value.

14. The method of claim 1, further comprising prompting the apparatus to automatically dispense at least one automotive appearance care product fluid.

15. The method of claim 1, further comprising operating the apparatus to only dispense automotive appearance care product fluids.

16. The method of claim 1, further comprising dispensing each of the automotive appearance care product fluids individually.

17. The method of claim 1, further comprising varying the flow of at least one automotive appearance care product fluid using an adjustable fluid applicator.

18. The method of claim 1, further comprising moving the apparatus such that the apparatus is located proximate the automobiles to be treated using the automotive appearance care product fluids.

19. The method of claim 1, wherein the plurality of storage containers are provided by a distributor of the apparatus.

20. The method of claim 1, wherein the plurality of raw materials are provided by a distributor of the apparatus.

21. A method for dispensing automotive appearance care product fluids, comprising:

dispensing a plurality of automotive appearance care product fluids from an apparatus, wherein the apparatus comprises:

a plurality of storage containers comprising one or more raw materials, wherein each storage container is configured to contain at least one raw material;

a plurality of mixing systems coupled to the plurality of storage containers, wherein the mixing systems are configured to combine one or more of the raw materials with a carrier fluid to produce a plurality of automotive appearance care product fluids during use;

a plurality of storage vessels coupled to the plurality of mixing systems, wherein each automotive appearance care product fluid is stored in one storage vessel;

a plurality of pumps coupled to the plurality of storage vessels, wherein each pump is coupled to at least one storage vessel, and wherein the plurality of pumps are configured to produce a flow of automotive appearance care product fluids from the storage vessels during use; and a plurality of dispensing conduits coupled to the plurality of pumps, wherein each of the dispensing conduits is coupled to at least one pump, and wherein the dispensing conduits are configured to dispense automotive appearance care product fluids during use;

treating one or more automobiles using the dispensed automotive appearance care product fluids; and receiving a statement of a fee for using the apparatus based on a number of uses of the apparatus.

22. The method of claim 21, further comprising obtaining the apparatus from a distributor of the apparatus.

23. The method of claim 21, further comprising coupling the apparatus to a supply of carrier fluid.

24. The method of claim 21, further comprising coupling the apparatus to a supply of air.

25. The method of claim 21, wherein the fee statement is provided automatically by the apparatus.

26. The method of claim 21, wherein the fee statement for using the apparatus is based on a number of applications using the automotive appearance care product fluids.

27. The method of claim 21, wherein the fee statement for using the apparatus is based on a number of times the apparatus is refilled with raw materials.

28. The method of claim 21, wherein the fee statement for using the apparatus is based on a specified period of time the apparatus is used.

29. The method of claim 21, wherein the plurality of raw materials are automatically combined with the carrier fluid in the apparatus to produce the plurality of product fluids.

30. The method of claim 21, wherein the plurality of raw materials are automatically combined with the carrier fluid to produce the plurality of product fluids by the plurality of mixing systems in the apparatus.

31. The method of claim 21, wherein the plurality of raw materials are automatically combined with the carrier fluid and automatically provided to the plurality of storage vessels in the apparatus.

32. The method of claim 21, wherein each of the plurality of storage vessels is automatically refilled with product fluid when a level of fluid in each storage vessel is below a selected value.

33. The method of claim 21, further comprising prompting the apparatus to automatically dispense at least one automotive appearance care product fluid.

34. The method of claim 21, further comprising operating the apparatus to only dispense automotive appearance care product fluids.

35. The method of claim 21, further comprising dispensing each of the automotive appearance care product fluids individually.

36. The method of claim 21, further comprising varying the flow of at least one automotive appearance care product fluid using an adjustable fluid applicator.

37. The method of claim 21, further comprising moving the apparatus such that the apparatus is located proximate the automobiles to be treated using the automotive appearance care product fluids.

38. The method of claim 21, wherein the plurality of storage containers are provided by a distributor of the apparatus.

39. The method of claim 21, wherein the plurality of raw materials are provided by a distributor of the apparatus.

40. A method for dispensing automotive appearance care product fluids, comprising:

dispensing a plurality of automotive appearance care product fluids from an apparatus, wherein the apparatus comprises:

a plurality of storage containers comprising one or more raw materials, wherein each storage container is configured to contain at least one raw material;

a plurality of mixing systems coupled to the plurality of storage containers, wherein the mixing systems are configured to combine one or more of the raw materials with a carrier fluid to produce a plurality of automotive appearance care product fluids during use;

a plurality of storage vessels coupled to the plurality of mixing systems, wherein each automotive appearance care product fluid is stored in one storage vessel;

a plurality of pumps coupled to the plurality of storage vessels, wherein each pump is coupled to at least one storage vessel, and wherein the plurality of pumps are configured to produce a flow of automotive appearance care product fluids from the storage vessels during use; and a plurality of dispensing conduits coupled to the plurality of pumps, wherein each of the dispensing conduits is coupled to at least one pump, and wherein the dispensing conduits are configured to dispense automotive appearance care product fluids during use;

treating one or more automobiles using the dispensed automotive appearance care product fluids; and receiving a statement of a fee for using the apparatus based on a specified period of time the apparatus is used.

41. The method of claim 40, further comprising obtaining the apparatus from a distributor of the apparatus.

42. The method of claim 40, further comprising coupling the apparatus to a supply of carrier fluid.

43. The method of claim 40, further comprising coupling the apparatus to a supply of air.

44. The method of claim 40, wherein the fee statement is provided automatically by the apparatus.

45. The method of claim 40, wherein the fee statement for using the apparatus is based on a number of applications using the automotive appearance care product fluids.

46. The method of claim 40, wherein the fee statement for using the apparatus is based on a number of uses of the apparatus.

47. The method of claim 40, wherein the fee statement for using the apparatus is based on a number of times the apparatus is refilled with raw materials.

48. The method of claim 40, wherein the plurality of raw materials are automatically combined with the carrier fluid in the apparatus to produce the plurality of product fluids.

49. The method of claim 40, wherein the plurality of raw materials are automatically combined with the carrier fluid to produce the plurality of product fluids by the plurality of mixing systems in the apparatus.

50. The method of claim 40, wherein the plurality of raw materials are automatically combined with the carrier fluid and automatically provided to the plurality of storage vessels in the apparatus.

51. The method of claim 40, wherein each of the plurality of storage vessels is automatically refilled with product fluid when a level of fluid in each storage vessel is below a selected value.

52. The method of claim 40, further comprising prompting the apparatus to automatically dispense at least one automotive appearance care product fluid.

53. The method of claim 40, further comprising operating the apparatus to only dispense automotive appearance care product fluids.

54. The method of claim 40, further comprising dispensing each of the automotive appearance care product fluids individually.

55. The method of claim 40, further comprising varying the flow of at least one automotive appearance care product fluid using an adjustable fluid applicator.

56. The method of claim 40, further comprising moving the apparatus such that the apparatus is located proximate the automobiles to be treated using the automotive appearance care product fluids.

57. The method of claim 40, wherein the plurality of storage containers are provided by a distributor of the apparatus.

58. The method of claim 40, wherein the plurality of raw materials are provided by a distributor of the apparatus.

* * * * *